US012707164B2

(12) United States Patent
Ichino et al.

(10) Patent No.: US 12,707,164 B2
(45) Date of Patent: Aug. 11, 2026

(54) PHOTOELECTRIC CONVERSION DEVICE AND METHOD OF DRIVING PHOTOELECTRIC CONVERSION DEVICE

(71) Applicant: CANON KABUSHIKI KAISHA, Tokyo (JP)

(72) Inventors: Shinya Ichino, Saitama (JP); Takanori Suzuki, Tokyo (JP); Satoshi Kato, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 20 days.

(21) Appl. No.: 19/061,363

(22) Filed: Feb. 24, 2025

(65) Prior Publication Data

US 2025/0280206 A1 Sep. 4, 2025

(30) Foreign Application Priority Data

Feb. 29, 2024 (JP) ................................ 2024-029426

(51) Int. Cl.
*H04N 25/62* (2023.01)
*H04N 25/42* (2023.01)
(Continued)

(52) U.S. Cl.
CPC ............ *H04N 25/62* (2023.01); *H04N 25/42* (2023.01); *H04N 25/441* (2023.01);
(Continued)

(58) Field of Classification Search
None
See application file for complete search history.

(56) References Cited

U.S. PATENT DOCUMENTS 7,817,199 B2 10/2010 Tamashita
9,267,840 B2 2/2016 Kato
(Continued)

FOREIGN PATENT DOCUMENTS

JP 2018-33072 A 3/2018
JP 2021-69021 A 4/2021
(Continued)

OTHER PUBLICATIONS

U.S. Appl. No. 19/180,309, filed Apr. 16, 2025 by Makiko Saito.
(Continued)

*Primary Examiner* — Paul M Berardesca
(74) *Attorney, Agent, or Firm* — VENABLE LLP

(57) ABSTRACT

A photoelectric conversion device includes pixels arranged to form rows and columns, an output line group arranged for each column and including first and second output lines, a pixel control unit that controls readout of signals from the pixels in units of rows, and an amplitude limiting unit that limits ranges of signal amplitudes of the output line groups. The pixel control unit executes a first scan of reading out signals from pixels connected to the first output, and a second scan of reading out signals from pixels connected to the second output lines. When the readout period from the first pixel and the readout period from the second pixel connected to the second output line adjacent to the first output line connected to the first pixel overlap each other, the amplitude limiting unit limits maximum signal amplitudes in the first and second output lines to different ranges.

23 Claims, 21 Drawing Sheets

(51) Int. Cl.
*H04N 25/441* (2023.01)
*H04N 25/709* (2023.01)
*H04N 25/778* (2023.01)
*H04N 25/779* (2023.01)
*H04N 25/78* (2023.01)

(52) U.S. Cl.
CPC ......... *H04N 25/709* (2023.01); *H04N 25/778* (2023.01); *H04N 25/779* (2023.01); *H04N 25/78* (2023.01)

(56) References Cited

U.S. PATENT DOCUMENTS 9,813,681 B2 11/2017 Kato
9,966,395 B2 5/2018 Kato
10,116,854 B2 10/2018 Kato
10,297,633 B2 5/2019 Suzuki
11,218,654 B2 1/2022 Suzuki
11,800,253 B2 10/2023 Saito
2013/0146749 A1* 6/2013 Cieslinski ............... H10F 39/15 250/208.1
2013/0182163 A1* 7/2013 Kobayashi .............. H10F 39/80 348/302
2015/0062396 A1* 3/2015 Yamaoka ............... H04N 25/78 348/302
2016/0293648 A1* 10/2016 Soda ..................... H10F 39/802
2016/0316166 A1* 10/2016 Kubo ..................... H04N 25/67
2017/0155839 A1* 6/2017 Yamazaki .............. H04N 25/78
2019/0043913 A1* 2/2019 Juen .................... H10F 39/8037
2019/0103434 A1* 4/2019 Kobayashi ............ H10F 39/811
2019/0104265 A1* 4/2019 Totsuka .................. H03M 1/00
2019/0104267 A1* 4/2019 Kobayashi ................ G06T 7/55
2019/0104270 A1* 4/2019 Sakurai .................. H04N 25/79
2019/0104271 A1* 4/2019 Isoda ................... H04N 25/778
2019/0104274 A1* 4/2019 Yoshida ............... H04N 25/778
2019/0131338 A1* 5/2019 Komai ................... H04N 25/78
2020/0128168 A1* 4/2020 Ichimaru .............. H04N 23/667
2020/0412992 A1* 12/2020 Kobayashi ............. H04N 23/60
2022/0345584 A1* 10/2022 Nakazawa ......... H04N 1/00822
2023/0041974 A1 2/2023 Kobayashi
2023/0199338 A1* 6/2023 Adachi ................ H04N 25/616 348/162
2023/0292024 A1 9/2023 Ichino
2024/0031709 A1 1/2024 Ichino
2024/0040279 A1 2/2024 Arishima
2024/0334074 A1* 10/2024 Kono ..................... H04N 25/40
2024/0373148 A1 11/2024 Kobayashi
2025/0184636 A1* 6/2025 Miki .................... H04N 25/766
2025/0280212 A1* 9/2025 Kumaki ................. H04N 25/78

FOREIGN PATENT DOCUMENTS

JP 2023-23214 A 2/2023
WO WO-2024195753 A1 * 9/2024 ............. H04N 25/76

OTHER PUBLICATIONS

U.S. Appl. No. 19/183,955, filed Apr. 21, 2025 by Hideo Kobayashi.
U.S. Appl. No. 19/184,547, filed Apr. 21, 2025 by Hideo Kobayashi.
U.S. Appl. No. 19/184,054, filed Apr. 21, 2025 by Taro Muraki.
U.S. Appl. No. 19/188,222, filed Apr. 24, 2025 by Takanori Suzuki.

* cited by examiner

DISPLAY FRAME SYNCHRONIZATION SIGNAL
SENSING FRAME SYNCHRONIZATION SIGNAL
131
141
t2
TIME t
y-TH ROW
x-TH ROW
READOUT ROW 200
206
202
204
APERTURE
201
IMAGING DEVICE
208
SIGNAL PROCESSING UNIT
210
MEMORY UNIT
212
EXTERNAL I/F UNIT
COMPUTER
220
TIMING GENERATION UNIT
GENERAL CONTROL/OPERATION UNIT
218
STORAGE MEDIUM CONTROL I/F UNIT
216
STORAGE MEDIUM
214

300
IMAGING DEVICE 310
IMAGE PROCESSING UNIT 312
PARALLAX ACQUISITION UNIT 314
DISTANCE ACQUISITION UNIT 316
COLLISION DETERMINATION UNIT 318
320
VEHICLE INFORMATION ACQUISITION DEVICE
330
CONTROL ECU
340
ALERT DEVICE

PHOTOELECTRIC CONVERSION DEVICE AND METHOD OF DRIVING PHOTOELECTRIC CONVERSION DEVICE

BACKGROUND OF THE INVENTION

Field of the Invention

The present invention relates to a photoelectric conversion device and a method of driving the photoelectric conversion device.

Description of the Related Art

Japanese Patent Application Laid-Open No. 2018-033072 describes an imaging device in which two output lines are arranged in each pixel column of a pixel region, and image signals having different frame rates, such as a display signal and a sensing signal, are simultaneously read out from these two output lines. According to the imaging device described in Japanese Patent Application Laid-Open No. 2018-033072, it is possible to acquire a display signal in accordance with the frame rate of the image display device while acquiring a sensing signal at high speed.

However, in the imaging device described in Japanese Patent Application Laid-Open No. 2018-033072, no particular consideration is given to the parasitic capacitance between the output line for reading the display signal and the output line for reading the sensing signal. Therefore, crosstalk occurs through the parasitic capacitance between the output line from which the display signal is read out and the output line from which the sensing signal is read out, and image quality degradation of the display signal may occur according to the intensity of the sensing signal read out at the same time.

SUMMARY OF THE INVENTION

An advantage of some aspects of the present invention is to provide a photoelectric conversion device capable of acquiring a display signal having excellent image quality while acquiring a sensing signal at high speed, and a method of driving the same.

According to an embodiment of the present specification, there is provided a photoelectric conversion device including a plurality of pixels arranged to form a plurality of rows and a plurality of columns and each including a photoelectric conversion unit, a plurality of output line groups arranged corresponding to the plurality of columns and each including at least a first output line and a second output line, a pixel control unit configured to control a readout of signals from the plurality of pixels to the plurality of output line groups in units of the rows, and an amplitude limiting unit configured to limit ranges of signal amplitudes of the signals output to the plurality of output line groups, wherein the pixel control unit is configured to execute a first scan in which signals of pixels connected to the first output line of each column are sequentially read out in units of the row, and a second scan in which signals of pixels connected to the second output line of each column are sequentially read out in units of the row, wherein a period in which a signal of a first pixel is read out to the first output line by the first scan and a period in which a signal of a second pixel connected to the second output line adjacent to the first output line to which the first pixel is connected is read out to the second output line by the second scan overlap each other, and wherein the amplitude limiting unit is configured to limit ranges of signal amplitudes in the first output line and the second output line so that a maximum signal amplitude in the first output line and a maximum signal amplitude in the second output line are different from each other when the signals of first pixel and the second pixel are read out.

According to another disclosure of the present specification, there is provided a method of driving a photoelectric conversion device including a plurality of pixels arranged to form a plurality of rows and a plurality of columns and each including a photoelectric conversion unit, and a plurality of output line groups arranged corresponding to the plurality of columns and each including at least a first output line and a second output line, the method including limiting ranges of signal amplitudes in the first output line and the second output line so that a maximum signal amplitude in the first output line and a maximum signal amplitude in the second output line are different, when a first scan in which a signal of a pixel connected to the first output line of each column is sequentially read out in units of the row and a second scan in which a signal of a pixel connected to the second output line of each column is sequentially read out in units of the row are executed, and a period in which a signal of a first pixel is read out by the first scan and a period in which a signal of a second pixel connected to the second output line adjacent to the first output line to which the first pixel is connected is read out by the second scan overlap each other.

Further features of the present invention will become apparent from the following description of exemplary embodiments with reference to the attached drawings.

BRIEF DESCRIPTION OF THE DRAWINGS

FIG. 2 is an equivalent circuit diagram illustrating a configuration example of a pixel of the photoelectric conversion device according to the first embodiment.

FIG. 7 is an equivalent circuit diagram illustrating a configuration example of a pixel of a photoelectric conversion device according to a second embodiment.

DESCRIPTION OF THE EMBODIMENTS

Figure 1:
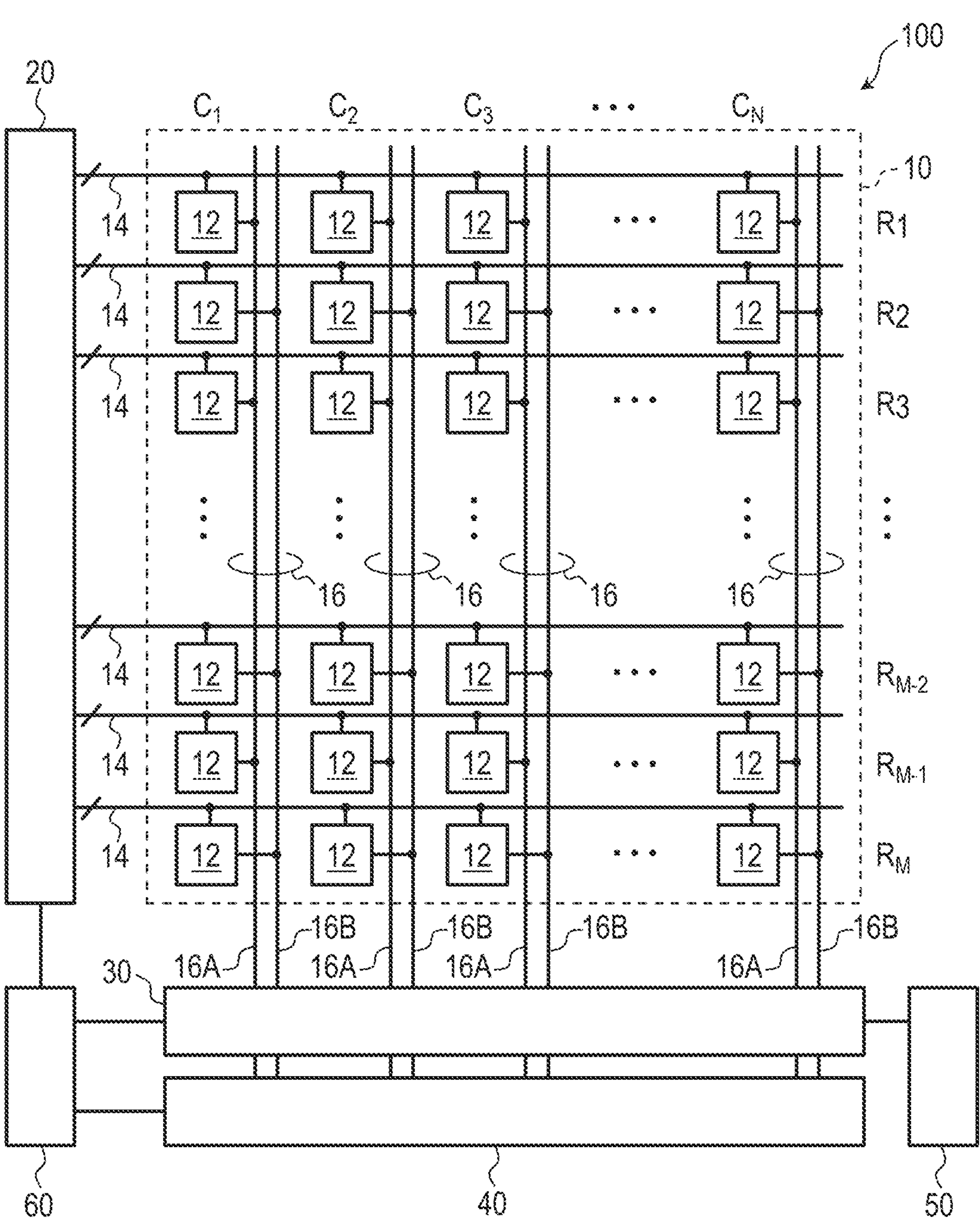
FIG. 1 is a block diagram illustrating a schematic configuration of a photoelectric conversion device according to a first embodiment.

Preferred embodiments of the present invention will now be described in detail in accordance with the accompanying drawings. The following embodiments do not limit the invention according to the claims. Although a plurality of features are described in the embodiments, not all of the plurality of features are essential to the invention, and the plurality of features may be arbitrarily combined. Further, in the accompanying drawings, the same or similar components are denoted by the same reference numerals, and redundant description thereof is omitted.

First Embodiment

Figure 2:
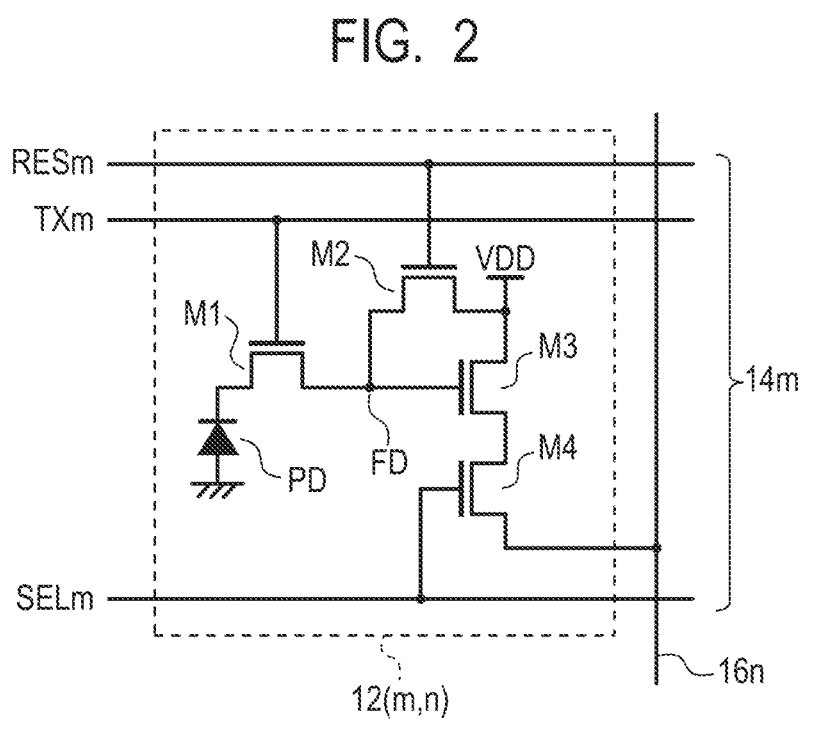
Figure 3:
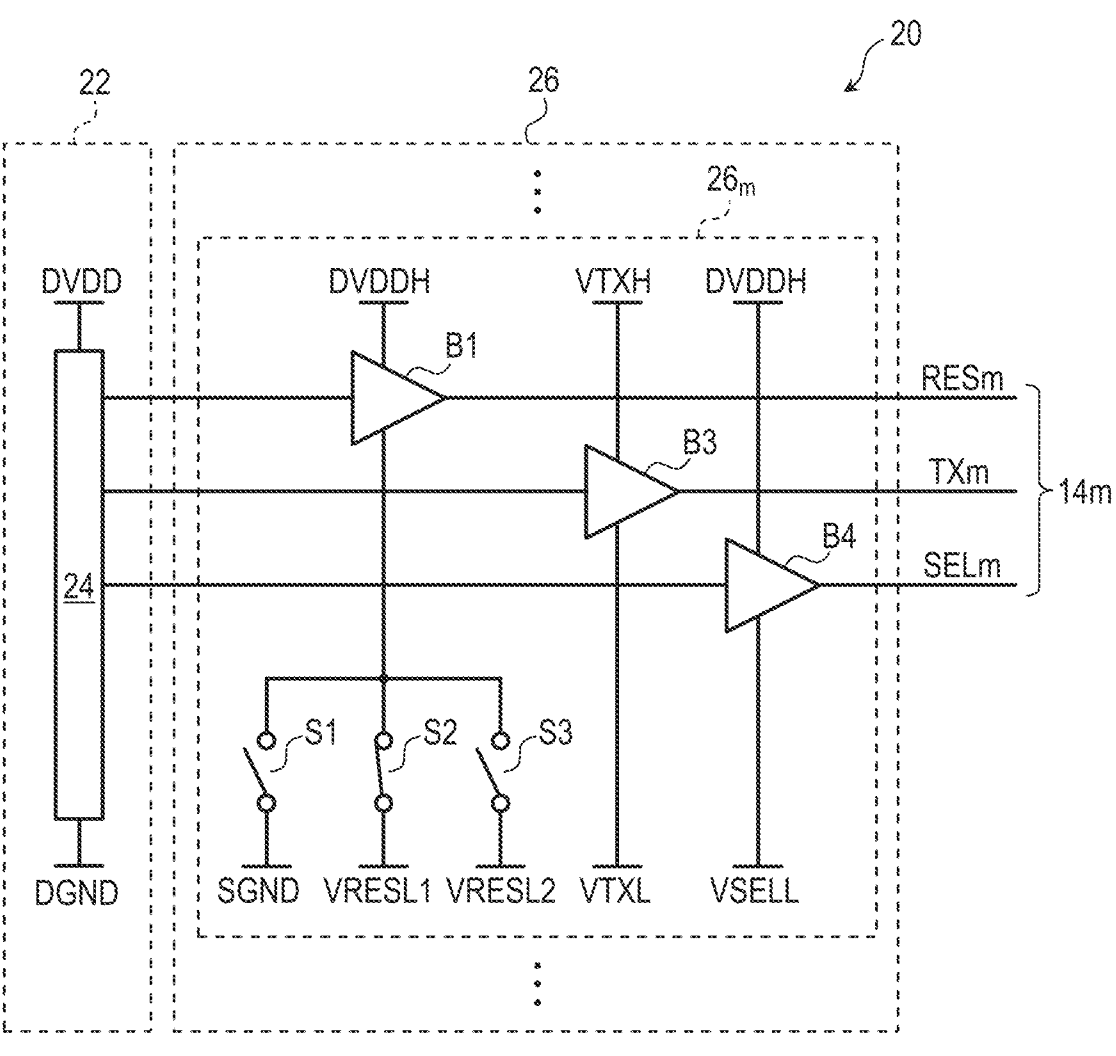
FIG. 3 is a block diagram illustrating a configuration example of a vertical driving circuit of the photoelectric conversion device according to the first embodiment.

A structure of a photoelectric conversion device according to a first embodiment of the present invention will be described with reference to FIG. 1 to FIG. 3. FIG. 1 is a block diagram illustrating a schematic configuration of a photoelectric conversion device according to the present embodiment. FIG. 2 is an equivalent circuit diagram illustrating a configuration example of a pixel of the photoelectric conversion device according to the present embodiment. FIG. 3 is a block diagram illustrating a configuration example of a vertical driving circuit of the photoelectric conversion device according to the present embodiment.

The photoelectric conversion device 100 according to the present embodiment may include, as illustrated in, e.g., FIG. 1, a pixel region 10, a vertical driving circuit 20, a signal processing unit 30, a horizontal driving circuit 40, an output circuit 50, and a system control unit 60.

The pixel region 10 is provided with a plurality of pixels 12 arranged in a matrix over a plurality of rows and a plurality of columns. Each of the pixels 12 includes a photoelectric conversion unit that generates and accumulates signal charge in response to incidence of light, and outputs a pixel signal according to the amount of received light. FIG. 1 exemplifies a case where the pixel region 10 is configured by a pixel array of (M-number of row)×(N-number of rows) including M-number of pixel rows including the first row $R_1$ to the M-th row $R_M$ and N-number of pixel columns including the first column $C_1$ to the N-th column $C_N$. Here, M and N are arbitrary natural numbers. Typically, tens of millions of pixels 12 are arranged in the pixel region 10. The number of rows and the number of columns of the pixel array arranged in the pixel region 10 are not particularly limited. In addition to effective pixels that output pixel signals according to the amount of incident light, an optical black pixel in which the photoelectric conversion unit is shielded from light, a dummy pixel that does not output signal, and the like may be disposed in the pixel region 10.

In each row of the pixel region 10, a control line group 14 is arranged so as to extend in a first direction (lateral direction in FIG. 1). Each of the control line groups 14 includes a plurality of control lines corresponding to a plurality of types of control signals. Each of the plurality of control lines is connected to the pixels 12 arranged in the corresponding row and forms a signal line common to these pixels 12. The first direction in which the control line group 14 extends may be referred to as a row direction or a horizontal direction. The control line group 14 is connected to the vertical driving circuit 20. In the following description, when the control line group 14 is distinguished for each pixel row, the control line group 14 is represented as a control line group 14*m* with a row number of m.

In each column of the pixel region 10, an output line group 16 is arranged so as to extend in a second direction (vertical direction in FIG. 1) intersecting the first direction. Each of the output line groups 16 includes a plurality of output lines. Although FIG. 1 exemplifies a case where the output line group 16 of each column includes two output lines 16A and 16B in order to simplify the following description, the number of output lines constituting the output line group 16 of each pixel column may be three or more. Each of the plurality of output lines is connected to the pixels 12 arranged in the corresponding column and forms a signal line common to these pixels 12. More specifically, each pixel 12 is connected to any of the plurality of output lines constituting the output line group 16 of the corresponding column. In the configuration example of FIG. 1, an output line 16A is connected to the pixels 12 in odd rows (first row $R_1$, third row $R_3$, . . . , (M−1)-th row $R_{M-1}$), and an output line 16B is connected to the pixels 12 in even rows (second row $R_2$, fourth row $R_4$, . . . , M-th row $R_M$). The output line groups 16 are connected to the signal processing unit 30. In the following description, when the output line groups 16 and the output lines 16A and 16B are distinguished for each pixel column, the output line group 16 and the output lines 16A and 16B are represented as an output line group 16*n* and the output lines 16*n*A and 16*n*B with a column number of n.

The vertical driving circuit 20 has a function of generating a control signal for driving the pixels 12 in response to a control signal supplied from the system control unit 60 and supplying the generated control signal to the pixels 12 via the control line group 14. The vertical driving circuit 20 sequentially outputs a control signal to the control line group 14 of each row and sequentially drives the pixels 12 of the pixel region 10 in units of rows. The signals read out from the pixels 12 in units of rows are input to the signal processing unit 30 via the output line groups 16 arranged in each column of the pixel region 10. That is, the vertical driving circuit 20 is a pixel control unit that controls readout of signals from the plurality of pixels 12 constituting the pixel region 10 to the plurality of output lines 16A and 16B in units of rows. Details of the vertical driving circuit 20 will be described later.

The signal processing unit 30 includes a plurality of column circuits (not illustrated) provided corresponding to the plurality of output lines 16A and 16B constituting the output line group 16 of each column. Each of the plurality of column circuits may include a current source, an amplitude limiting circuit, a processing circuit, and a signal holding circuit. The current source constitutes a source follower amplifier together with an amplifier transistor M3 to be described later, which is one of constituent elements of the pixel 12, and has a function of reading out a pixel signal of the pixel 12 to the output line group 16. The amplitude limiting circuit has a function of limiting the range of the signal amplitude that can be taken by the output line group 16 to a predetermined range. The processing circuit has a function of performing predetermined signal processing on the pixel signal output via the corresponding output line group 16. Examples of the signal processing performed by the processing circuit include amplification processing, correction processing by correlated double sampling (CDS), and analog-to-digital conversion (AD conversion) processing. The signal holding circuit includes a memory for holding the pixel signal processed by the processing circuit.

The horizontal driving circuit 40 has a function of generating a control signal for reading out a pixel signal from the signal processing unit 30 in response to a control signal supplied from the system control unit 60 and supplying the generated control signal to the signal processing unit 30. The horizontal driving circuit 40 sequentially scans the column circuits of each column of the signal processing unit 30, and outputs the pixel signals held in each column to the output circuit 50.

The output circuit 50 is a circuit that includes an external interface circuit and outputs the signal processed by the signal processing unit 30 to the outside of the photoelectric conversion device 100. The external interface circuit included in the output circuit 50 is not particularly limited. As the external interface circuit, for example, a SERializer/DESerializer (SerDes) transmission circuit may be applied. The SerDes transmission circuit is, for example, a Low Voltage Differential Signaling (LVDS) circuit or a Scalable Low Voltage Signaling (SLVS) circuit.

The system control unit 60 is a control circuit having a function of generating control signals for controlling the operations of the vertical driving circuit 20, the signal processing unit 30, and the horizontal driving circuit 40 and supplying the generated control signals to each functional block. At least a part of the control signals supplied to the functional blocks may be supplied from the outside of the photoelectric conversion device 100.

Next, a configuration example of the pixel 12 according to the present embodiment will be described with reference to FIG. 2. FIG. 2 is an equivalent circuit diagram of the pixel 12(*m, n*) arranged in the m-th row and the n-th column among the plurality of pixels 12 constituting the pixel region 10. Here, m is an integer of 1 to M, and n is an integer of 1 to N. The other pixels 12 constituting the pixel region 10 may have the same circuit configuration as the pixel 12(*m, n*).

The pixel 12(*m, n*) may include, as illustrated in, e.g., FIG. 2, a photoelectric conversion element PD, a transfer transistor M1, a reset transistor M2, an amplifier transistor M3, and a select transistor M4.

The photoelectric conversion element PD may be a photodiode configured by a p-n junction of a semiconductor or an element having a photoelectric conversion film configured to include at least one of an organic thin film and an inorganic thin film. The photoelectric conversion element PD has an anode connected to a ground voltage node and a cathode connected to a source of the transfer transistor M1. A drain of the transfer transistor M1 is connected to a source of the reset transistor M2 and a gate of the amplifier transistor M3. A node FD to which the drain of the transfer transistor M1, the source of the reset transistor M2, and the gate of the amplifier transistor M3 are connected is a so-called floating diffusion. The floating diffusion includes a capacitance component (floating diffusion capacitance) and has a function as a charge holding portion. The floating diffusion capacitance may include a gate capacitance and a p-n junction capacitance of the transistor, an interconnection capacitance, and the like. A drain of the reset transistor M2 and a drain of the amplifier transistor M3 are connected to a node to which a power supply voltage (voltage VDD) is supplied. A source of the amplifier transistor M3 is connected to a drain of the select transistor M4. A source of the select transistor M4 is connected to the output line group 16*n*.

In the case of the pixel configuration of FIG. 2, the control line group 14 of each row includes three control lines including a control line connected to a gate of the transfer transistor M1, a control line connected to a gate of the reset transistor M2, and a control line connected to a gate of the select transistor M4. The control signal TXm is supplied from the vertical driving circuit 20 to the gate of the transfer transistor M1. The control signal RESm is supplied from the vertical driving circuit 20 to the gate of the reset transistor M2. The control signal SELm is supplied from the vertical driving circuit 20 to the gate of the select transistor M4. When each transistor is formed of an n-channel MOS transistor, the corresponding transistor is turned on when a high-level control signal is supplied from the vertical driving circuit 20. When a low-level control signal is supplied from the vertical driving circuit 20, the corresponding transistor is turned off.

Note that the present embodiment will be described on the assumption that electrons among electron-hole pairs generated in the photoelectric conversion element PD by light incidence are used as the signal charge (sometimes simply referred to as charge). When electrons are used as the signal charge, each transistor constituting the pixel 12 may be formed of an n-channel MOS transistor. However, the signal charge is not limited to electrons, and holes may be used as the signal charge. When holes are used as the signal charge, the conductivity type of each transistor may be opposite to that described in the present embodiment. The names of the source and the drain of the MOS transistor may vary depending on the conductivity type of the transistor and the functions of the transistors. Some or all of the names of the source and the drain used in the present embodiment may be referred to as reverse names.

The photoelectric conversion element PD converts (photoelectrically converts) the incident light into charge of an amount corresponding to the amount of the incident light and accumulates the generated charge. The transfer transistor M1 transfers the charge held by the photoelectric conversion element PD to the node FD by turning on. The charge transferred from the photoelectric conversion element PD is held by the capacitance component (floating diffusion capacitance) of the node FD. As a result, the node FD has a potential corresponding to the amount of charge transferred from the photoelectric conversion element PD by charge-voltage conversion by the floating diffusion capacitance.

The reset transistor M2 has a function of controlling a reset operation for resetting the node FD as a charge holding unit. That is, the reset transistor M2 is a reset unit that resets the node FD to a voltage corresponding to the voltage VDD by turning on. When the transfer transistor M1 is turned on together with the reset transistor M2, the photoelectric conversion element PD may be reset to a voltage corresponding to the voltage VDD. However, in resetting the photoelectric conversion element PD, the reset transistor M2 and the transfer transistor M1 do not necessarily need to be turned on. For example, after the transfer transistor M1 is turned on to transfer the signal charge of the photoelectric conversion element PD to the node FD, the reset transistor M2 is turned on to reset the node FD, whereby the signal charge of the photoelectric conversion element PD is also reset. The reset transistor M2 also has a function as an amplitude limiting unit that limits a range of signal amplitude that a signal output to the output line group 16*n* can take.

The select transistor M4 connects the amplifier transistor M3 to the output line group 16*n* by turning on. The amplifier transistor M3 has the drain to which the voltage VDD is supplied and the source to which a bias current is supplied from a current source (not illustrated) of the column circuit via the select transistor M4 and constitutes an amplifier unit (source follower circuit) having the gate as an input node. Accordingly, when the select transistor M4 is in the conductive state (on state), the amplifier transistor M3 outputs a signal corresponding to the potential of the node FD. As a result, the signal level of the output line group 16 becomes the signal level output by the amplifier transistor M3. In this sense, the amplifier transistor M3 and the select transistor M4 are an output unit that outputs the pixel signal according to the amount of charge held in the node FD.

Next, a configuration example of the vertical driving circuit 20 according to the present embodiment will be described with reference to FIG. 3. The vertical driving circuit 20 may include, as illustrated in, e.g., FIG. 3, a vertical scanning unit 24 and a buffer unit 26. The buffer unit 26 includes buffer units $\mathbf{26}_1$ to $\mathbf{26}_M$ corresponding to each row of the pixel region 10. FIG. 3 illustrates only the buffer unit $\mathbf{26}_m$ corresponding to the m-th row among the buffer units $\mathbf{26}_1$ to $\mathbf{26}_M$ for simplification of the drawing. The configuration of the buffer units $\mathbf{26}_1$ to $\mathbf{26}_M$ other than the buffer unit $\mathbf{26}_m$ may be the same as that of the buffer unit $\mathbf{26}_m$.

The vertical scanning unit 24 has a function of generating a control signal for driving the pixels 12 in response to a control signal supplied from the system control unit 60 and supplying the generated control signal to the pixels 12 via the control line group 14. A logic circuit such as a shift register or an address decoder may be used as the vertical scanning unit 24. The buffer unit 26 is a circuit that buffers the control signal generated by the vertical scanning unit 24, and includes buffer circuits (buffer circuits B1, B3, and B4 in FIG. 3) connected to each of the plurality of control lines constituting each of the control line groups 14. The buffer circuit is mainly constituted by an inverter circuit or the like, but the circuit configuration is not particularly limited.

The buffer unit $\mathbf{26}_m$ may include, as illustrated in, e.g., FIG. 3, buffer circuits B1, B3, and B4, and switches S1, S2, and S3. The buffer circuit B1 is configured to buffer a control signal output from the vertical scanning unit 24 and output the control signal as a control signal RESm to a corresponding control line of the control line group 14*m*. The buffer circuit B3 is configured to buffer a control signal output from the vertical scanning unit 24 and output the control signal as a control signal TXm to a corresponding control line of the control line group 14*m*. The buffer circuit B4 is configured to buffer a control signal output from the vertical scanning unit 24 and output the control signal as a control signal SELm to a corresponding control line of the control line group 14*m*.

The power supply voltage DVDDH is supplied to a high-level-side voltage node of the buffer circuit B1. A low-level-side voltage node of the buffer circuit B1 is supplied with the ground voltage SGND via the switch S1, the voltage VRESL1 via the switch S2, or the voltage VRESL2 via the switch S3. With this configuration, the high-level of the control signal RESm supplied to the pixel 12(*m, n*) becomes the power supply voltage DVDDH. The low-level of the control signal RESm may be selected from three types of voltages, i.e., the ground voltage SGND, the voltage VRESL1, and the voltage VRESL2, according to the connection of the switches S1 to S3. More specifically, by individually setting the connection of the switches S1 to S3 for each row, the low-level of the control signal RESm may be changed for each row. The voltages VRESL1 and VRESL2 may be supplied from a reference voltage generation circuit (not illustrated) included in the photoelectric conversion device 100.

The voltage VTXH is supplied to a high-level-side voltage node of the buffer circuit B3. The voltage VTXL is supplied to a low-level-side voltage node of the buffer circuit B3. With this configuration, the high-level of the control signal TXm supplied to the pixel 12(*m, n*) becomes the voltage VTXH, and the low-level of the control signal TXm becomes the voltage VTXL.

The power supply voltage DVDDH is supplied to a high-level-side voltage node of the buffer circuit B4. The voltage VSELL is supplied to a low-level-side voltage node of the buffer circuit B4. With this configuration, the high-level of the control signal SELm supplied to the pixel 12(*m, n*) becomes the power supply voltage DVDDH, and the low-level of the control signal SELm becomes the voltage VSELL.

Figure 4:
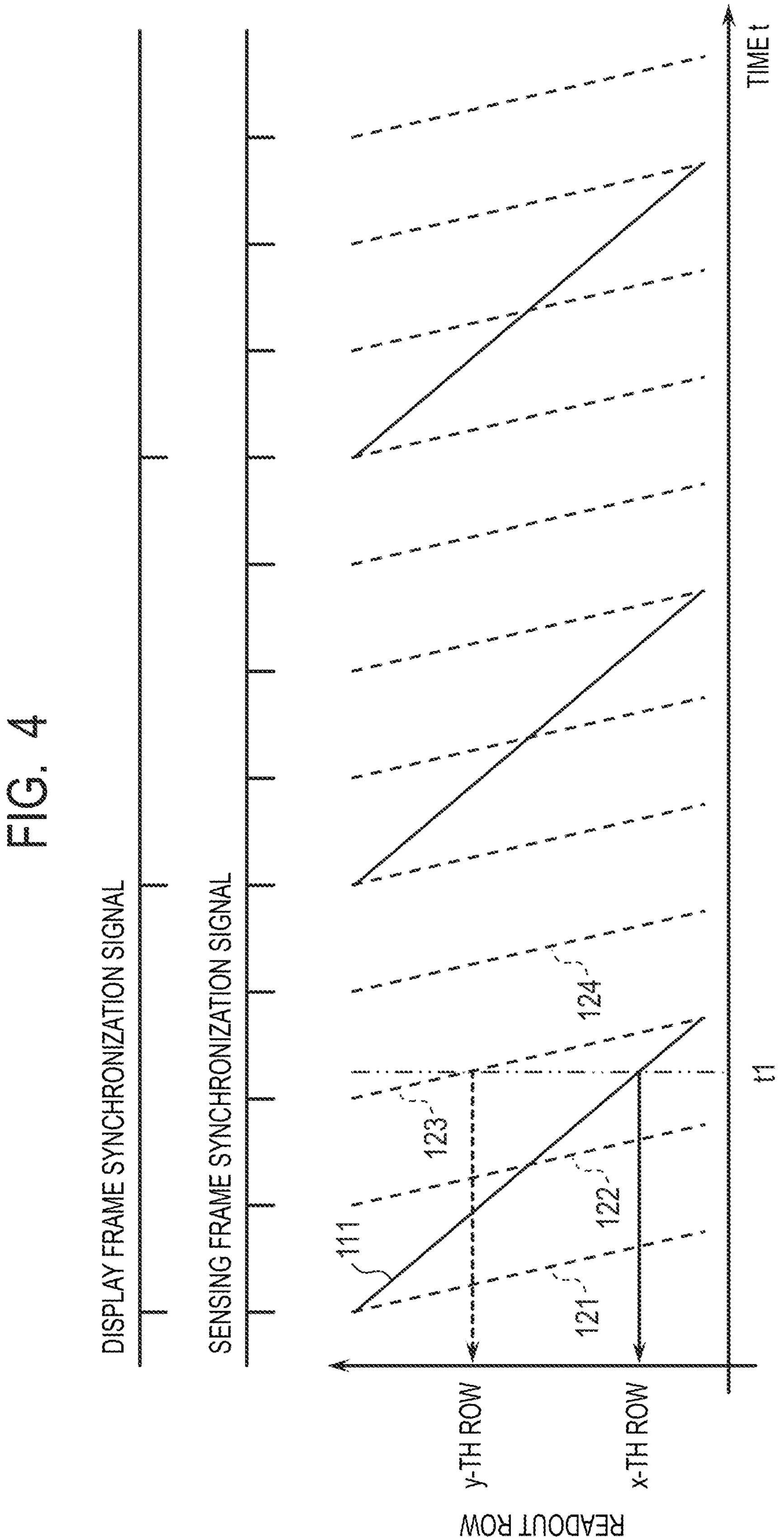
FIG. 4 is a diagram illustrating a scanning method in a row direction in a method of driving the photoelectric conversion device according to the first embodiment.
Figure 5:
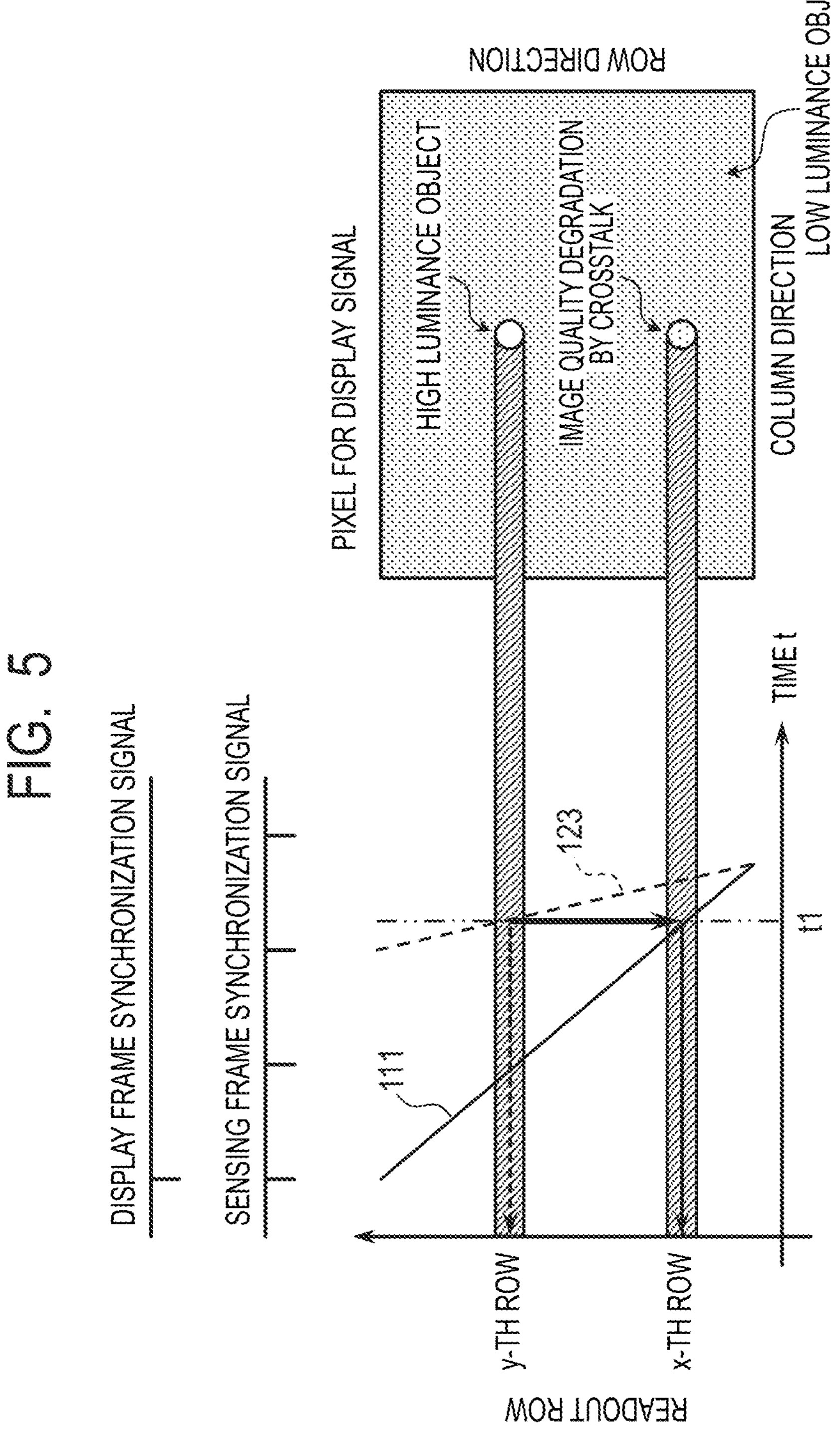
FIG. 5 is a diagram conceptually illustrating crosstalk in the photoelectric conversion device according to the first embodiment.
Figure 6:
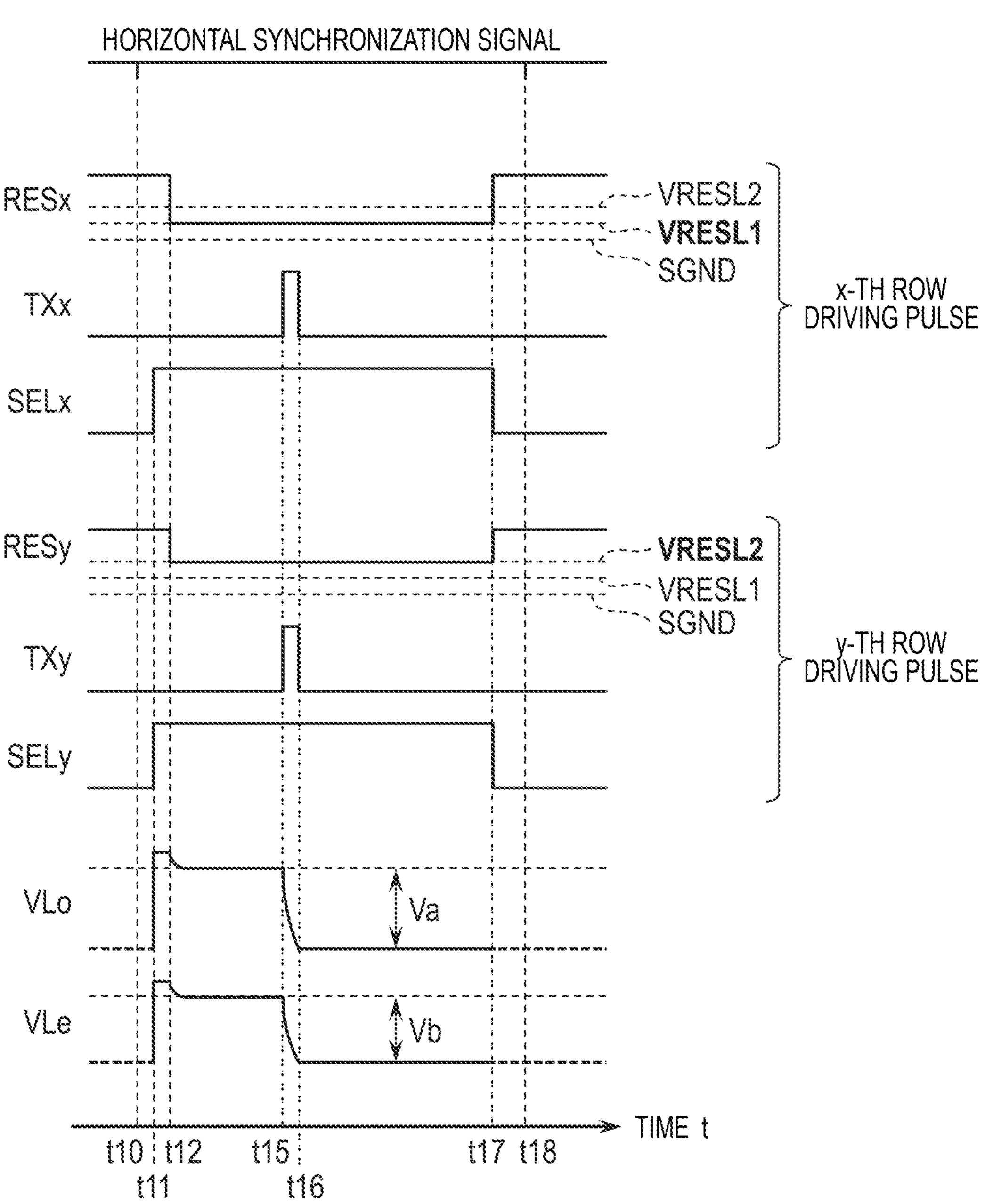
FIG. 6 is a timing chart illustrating the method of driving the photoelectric conversion device according to the first embodiment.

Next, a method of driving the photoelectric conversion device according to the present embodiment will be described with reference to FIG. 4 to FIG. 6. FIG. 4 is a diagram illustrating a scanning method in a row direction in the photoelectric conversion device according to the present embodiment. FIG. 5 is a diagram conceptually illustrating crosstalk in the photoelectric conversion device according to the present embodiment. FIG. 6 is a timing chart illustrating a method of driving the photoelectric conversion device according to the present embodiment.

First, a scanning method in the row direction in the photoelectric conversion device according to the present embodiment will be described with reference to FIG. 4. In FIG. 4, the horizontal axis represents time, and the vertical axis represents a pixel row from which signals are read out. A straight line indicated by a solid line indicates a scan of display signals used for image formation in the row direction, and a straight line indicated by a broken line indicates a scan of sensing signals in the row direction. The term "sensing" as used herein means an operation of acquiring phase difference information for focusing on a display object or light amount information for adjusting the amount of light of an image being displayed. The scan of the display signals is started in synchronization with the display frame synchronization signal, and the scan of the sensing signals is started in synchronization with the sensing frame synchronization signal.

The vertical driving circuit 20 is configured to execute scanning for sequentially reading out signals of the pixels 12 connected to the output line 16A in units of rows and scanning for sequentially reading out signals of the pixels 12 connected to the output line 16B in units of rows. In the driving example of FIG. 4, it is assumed that among the output lines constituting the output line group 16 in each column, the output line 16A connected to the pixels 12 in the odd-numbered rows is used as an output line of a display signal, and the output line 16B connected to the pixels 12 in the even-numbered rows is used as an output line of a sensing signal. By distributing the display signal and the sensing signal to the output lines 16A and 16B of each column and selecting the pixels 12 so that both signals are not read out to the same output line, the display signal and the sensing signal of the pixels 12 of different rows of the same column may be read out at the same time. In other words, two different scanning modes, i.e., a scanning mode for reading out a display signal and a scanning mode for reading out a sensing signal, are executed in parallel, and pixel signals in these two scanning modes may be simultaneously read out.

In the driving example of FIG. 4, while the scan of the display signals is performed once with respect to the pixel region 10, the scan of the sensing signals is performed a plurality of times with respect to the pixel region 10. That is, scans 121, 122, and 123 of the sensing signals are sequentially performed in parallel with a period in which one scan 111 of the display signal is performed. Since the scan of the display signals is not performed in the period of the scan 124 of the sensing signals, only the sensing signal is read out. The frame rate of the sensing frame synchronization signal is set to four times the frame rate of the display frame synchronization signal. In other words, four frames of the sensing signal may be obtained while one frame of the display signal is obtained. For example, when the frame rate of the display signal is 30 fps, the frame rate of the sensing signal may be set to 120 fps, and a relatively large number of sensing signals may be read out from the pixels 12 when viewed on the time axis with respect to the display signal.

Such an operation may be performed by thinning out the number of readout rows of the sensing signal to one-fourth of the number of readout rows of the display signal. Although the resolution of the image signal is reduced by thinning out the readout rows, the readout speed in the row direction is increased by the amount of thinning out, and a sensing signal with high time resolution may be obtained.

On the other hand, as a concern in the case where the above-described driving method is applied, there is a possibility that crosstalk may occur through parasitic capacitance between the output line 16A used for reading out the display signal and the output line 16B used for reading out the sensing signal. The term "crosstalk" as used herein refers to a change in the voltage of a certain output line under the influence of a change in the voltage of another adjacent signal line. For example, in a case where the output line 16A and the output line 16B are disposed adjacent to each other, when the voltage of the output line 16B rises, for example, the voltage of the output line 16A may also rise at a constant ratio via the parasitic capacitance between the output line 16A and the output line 16B.

The crosstalk described above will be conceptually described with reference to FIG. 5. The driving method of the present embodiment is characterized in that the signals of the pixels 12 arranged in different rows of the same pixel column can be read out at the same time, for example, as illustrated as the timing of time t1 in FIG. 4 and FIG. 5. For example, when the sensing signal (the y-th row in FIG. 5) and the display signal (the x-th row in FIG. 5) read out at the time t1 is a high luminance signal and a low luminance signal, respectively, the output line 16A from which the display signal is read out may be affected by the output line 16B from which the sensing signal is read out. Similarly, the output line 16B from which the sensing signal is read out may be affected by the output line 16A from which the display signal is read out. As a result, the high-luminance information affected by the y-th row is mixed as a false signal into the display signal of the x-th row which should be originally low-luminance, and as a result, the quality of the display image may be deteriorated. Conversely, the luminance information of the display signal may be mixed into the sensing signal as a false signal.

Hereinafter, a driving method of the photoelectric conversion device suitable for obtaining a high-quality display signal by suppressing the influence of crosstalk via the parasitic capacitance between the output line 16A from which the display signal is read out and the output line 16B from which the sensing signal is read out will be described with reference to FIG. 6.

FIG. 6 illustrates the transition of the waveform of each signal in one horizontal period corresponding to time t1 in FIG. 4 and FIG. 5. The control signals RESx, TXx, and SELx are control signals supplied to the pixels 12 in the x-th row that output display signals. The control signals RESy, TXy, and SELy are control signals supplied to the pixels 12 in the y-th row that output sensing signals. The voltage VLo is a voltage of the output line 16*n*A from which the display signal is output from the pixel 12(*x, n*) in the odd-numbered row. The voltage VLe is a voltage of the output line 16*n*B from which the sensing signal is output from the pixel 12(*y, n*) in the even-numbered row. It is assumed that the control signals RESx, TXx, SELx, RESy, TXy, and SELy are in an active state at high-level, and are in an inactive state at low-level.

In the period until time t10, the pixel signal is not read out. In this period, the control signals RESx and RESy are maintained at high-level. As a result, the reset transistors M2 of the pixel 12(*x, n*) in the x-th row, which is in the odd-numbered row, and the pixel 12(*y, n*) in the y-th row, which is in the even-numbered row, are maintained in the on state, and the reset operation of the nodes FD is continued. In addition, in this period, the control signals TXx, TXy, SELx, and SELy are maintained at low-level. At this time, the levels of the voltages VLo and VLe are arbitrary.

The period from the subsequent time t10 to time t18 corresponds to the readout period of the pixel 12(*x, n*) and the pixel 12(*y, n*), and signal readout from the photoelectric conversion elements PD of the pixel 12(*x, n*) and the pixel 12(*y, n*) is performed.

First, at time t11, the control signals SELx and SELy are controlled from low-level to high-level. Accordingly, the select transistors M4 of the pixel 12(*x, n*) is turned on, and the pixel 12(*x, n*) is electrically connected to the output line 16*n*A. In addition, the select transistor M4 of the pixel 12(*y, n*) is turned on, and the pixel 12(*y, n*) is electrically connected to the output line 16*n*B.

At the subsequent time t12, the control signals RESx and RESy are controlled from high-level to low-level. Accordingly, the reset transistors M2 of the pixel 12(*x, n*) and the pixel 12(*y, n*) are turned off, and the reset state of the nodes FD is released. At this time, by setting the switches S1 and S3 of the buffer circuit 26x to the off-state and the switch S2 to the on-state, low-level of the reset transistor M2 of the pixel 12(x, n) is set to the voltage VRESL1. Further, by setting the switches S1 and S2 of the buffer circuit 26y to the off-state and the switch S3 to the on-state, low-level of the reset transistor M2 of the pixel 12(y, n) is set to the voltage VRESL2 which is relatively higher than the voltage VRESL1.

When the control signals RESx and RESy transition from high-level to low-level, the potential of the node FD decreases to a predetermined potential due to coupling between the gate of the reset transistor M2 and the node FD. The voltage of the node FD, which is settled after the reset transistor M2 is turned off, becomes the reset voltage of the node FD of the pixel 12(x, n) and the pixel 12(y, n).

Accordingly, a signal corresponding to the reset voltage of the node FD of the pixel 12(x, n) is output to the output line 16nA via the amplifier transistor M3 and the select transistor M4. A signal corresponding to the reset voltage of the node FD of the pixel 12(y, n) is output to the output line 16nB via the amplifier transistor M3 and the select transistor M4. These signals are processed by the signal processing unit 30 in the subsequent stage and read out as an N-signal of the pixel 12(x, n) and an N-signal of the pixel 12(y, n), respectively.

At the subsequent time t15, the control signals TXx and TXy are controlled from low-level to high-level. Accordingly, the transfer transistors M1 of the pixel 12(x, n) is turned on, and the charge accumulated in the photoelectric conversion element PD of the pixel 12(x, n) is transferred to the node FD of the pixel 12(x, n), and the transfer transistors M1 of the pixel 12(y, n) is turned on, and the charge accumulated in the photoelectric conversion element PD of the pixel 12(y, n) is transferred to the node FD of the pixel 12(y, n).

Accordingly, a pixel signal corresponding to the amount of charge transferred from the photoelectric conversion element PD to the node FD of the pixel 12(x, n) is output to the output line 16nA via the amplifier transistor M3 and the select transistor M4. The voltage VLo of the output line 16nA changes according to the amount of charge generated in the photoelectric conversion element PD. A pixel signal corresponding to the amount of charge transferred from the photoelectric conversion element PD to the node FD of the pixel 12(y, n) is output to the output line 16nB via the amplifier transistor M3 and the select transistor M4. The voltage VLe of the output line 16nB changes according to the amount of charge generated in the photoelectric conversion element PD.

Here, the range of the signal amplitude that can be taken by the output lines 16A and 16B will be described in detail. The range of the signal amplitude that can be taken by the output lines 16A and 16B means the maximum signal amplitude that can be taken by the signals output to the output lines 16A and 16B.

As described above, the voltages of the output lines 16nA and 16nB change according to the amount of charge transferred from the photoelectric conversion element PD to the node FD. Specifically, in the case of the photoelectric conversion element PD of the electron accumulation type, the voltages (voltages VLo and VLe) of the output lines 16nA and 16nB change in a direction in which the voltage drops in accordance with the intensity of the pixel signal with reference to the reset voltage, as illustrated by the waveforms after the time t15 in FIG. 6.

When the voltage of the node FD drops in accordance with the amount of charge generated in the photoelectric conversion element PD, the gate-source voltage (hereinafter referred to as voltage VGS) of the reset transistor M2 increases accordingly. When the voltage VGS exceeds a certain value, the reset transistor M2 is turned on, and a part of the charge transferred to the node FD is discharged to the power supply node via the reset transistor M2 in the on-state. Since this operation continues until the reset transistor M2 is turned off, the voltage of the node FD can only drop to a level just below the reset transistor M2 is turned on due to an increase in the voltage VGS. In other words, the signal amplitude that the node FD can take is limited by the reset transistor M2.

Here, low-level of the control signal RESy supplied to the pixel 12(y, n) is the voltage VRESL2, which is higher than the voltage VRESL1 of low-level of the control signal RESx supplied to the pixel 12(x, n). In other words, the gate potential when the reset transistor M2 of the pixel 12(x, n) is controlled to the non-reset state is deeper than the gate potential when the reset transistor M2 of the pixel 12(y, n) is controlled to the non-reset state. That is, the potential difference between the gate potential when the reset transistor M2 is controlled to the non-reset state and the gate potential when the reset transistor M2 is controlled to the reset state is larger in the pixel 12(x, n) than in the pixel 12(y, n).

Therefore, the voltage VGS that can be taken by the reset transistor M2 of the pixel 12(y, n) with respect to a certain potential of the node FD becomes larger than the voltage VGS that can be taken by the reset transistor M2 of the pixel 12(x, n). As a result, the potential of the node FD at which the reset transistor M2 of the pixel 12(y, n) is turned on becomes higher than the potential of the node FD at which the reset transistor M2 of the pixel 12(x, n) is turned on. Therefore, the signal amplitude of the node FD that can be taken by the pixel 12(y, n) becomes smaller than the signal amplitude of the node FD that can be taken by the pixel 12(x, n). In other words, the signal amplitude of the node FD of the pixel 12(y, n) is limited more than the signal amplitude of the node FD of the pixel 12(x, n).

From the above, the signal amplitude (voltage Vb) that the output line 16nB can take is smaller than the signal amplitude (voltage Va) that the output line 16nA can take. Accordingly, even when the output of the output line 16nA from which the display signal is read out is affected by the output line 16nB from which the sensing signal is read out through the parasitic capacitance, the signal amplitude of the output line 16nB becomes small, and thus the influence of the crosstalk given to the output line 16nA becomes small.

In addition, the column circuit may amplify the signals output to the output lines 16nA and 16nB by applying a gain thereto. The gain may be a gain applied to an analog signal that increases or attenuates the amplitude of the analog signal, or a gain of an AD conversion that converts an analog signal into a digital signal. The greater the gain of the column circuit, the greater the amplified crosstalk component becomes, and the greater the influence of crosstalk becomes. Therefore, when the gain of the column circuit is large, it is preferable to limit the signal amplitude of the node FD that can be taken by the pixel 12(y, n) more than when the gain is small. For example, the difference between the signal amplitude of the node FD that can be taken by the pixel 12(x, n) and the signal amplitude of the node FD that can be taken by the pixel 12(y, n) at the first gain and the second gain is defined as a first difference and a second difference, respectively. In this case, if the second gain is larger than the first gain, the second difference is preferably larger than the first difference. From a wider perspective, when the second gain is larger than the first gain, the second difference, which is the difference between the maximum amplitudes of the output lines 16nA and 16nB in the second gain, may be larger than the first difference, which is the difference between the maximum amplitudes of the output lines 16nA and 16nB in the first gain.

For example, when the display signal of the x-th row is a low luminance signal and the sensing signal of the y-th row is a high luminance signal, the voltage drop amount of the output line 16nB from which the high luminance signal of the y-th row is read out is limited. Accordingly, it is possible to suppress the influence of the crosstalk via the parasitic capacitance from the output line 16nB from which the high luminance signal of the y-th row is read out to the output line 16nA from which the low luminance signal of the x-th row is read out, and it is possible to obtain a high quality display image.

In the present embodiment, the operation of suppressing the influence of crosstalk from the output line 16nB from which the sensing signal is read out to the output line 16nA from which the display signal is read out has been described. However, by limiting the signal amplitude of the output line 16nA from which the display signal is read out, it is possible to suppress the influence of crosstalk to the output line 16nB from which the sensing signal is read out, and to apply to an operation of acquiring a high-quality sensing image. That is, although the operation of the present embodiment aims to improve the image quality of the display image by limiting the amplitude of a part of the high luminance signal for sensing, it is possible to preferentially select one of the two scanning modes.

At the subsequent time t16, the control signals TXx and TXy are controlled from high-level to low-level. Accordingly, the transfer transistors M1 of the pixels 12(x, n) and 12(y, n) are turned off, and the transfer period of the charge from the photoelectric conversion element PD to the node FD in the pixels 12(x, n) and 12(y, n) ends. The signal output from the pixel 12(x, n) to the output line 16nA and the signal output from the pixel 12(y, n) to the output line 16nB are processed by the signal processing unit 30 after the signal levels are settled and read out as an S-signal of the pixel 12(x, n) and an S-signal of the pixel 12(y, n), respectively.

At the subsequent time t17, the control signals RESx and RESy are controlled from low-level to high-level. As a result, the reset transistors M2 of the pixels 12(x, n) and 12(y, n) are turned on, and the reset operation of the nodes FD of the pixels 12(x, n) and 12(y, n) is started.

Similarly, at time t17, the control signals SELx and SELy are controlled from high-level to low-level. Accordingly, the select transistor M4 of the pixel 12(x, n) is turned off, and the pixel 12(x, n) is electrically disconnected from the output line 16nA. In addition, the select transistor M4 of the pixel 12(y, n) is turned off, and the pixel 12(y, n) is electrically disconnected from the output line 16nB.

In this manner, signals of the pixel 12(x, n) and the pixel 12(y, n) are read out during one horizontal scanning period from the time t10 to the time t18. By repeatedly performing the same signal readout operation while scanning the pixel rows, the signals may be read out from the entire pixel region 10.

As described above, according to the present embodiment, it is possible to acquire a display signal having excellent image quality while acquiring a sensing signal at high speed.

In the present embodiment, an example in which the influence of crosstalk via a parasitic capacitance between adjacent output line groups of the same pixel column is suppressed is described, but the configuration of the photoelectric conversion device and the method of driving the same according to the present embodiment are applicable to other examples. For example, the configuration and the driving method of the photoelectric conversion device according to the present embodiment may also be applied to an example in which the influence of crosstalk via the parasitic capacitance between the output line groups across the adjacent pixel columns is suppressed.

Second Embodiment

Figure 7:
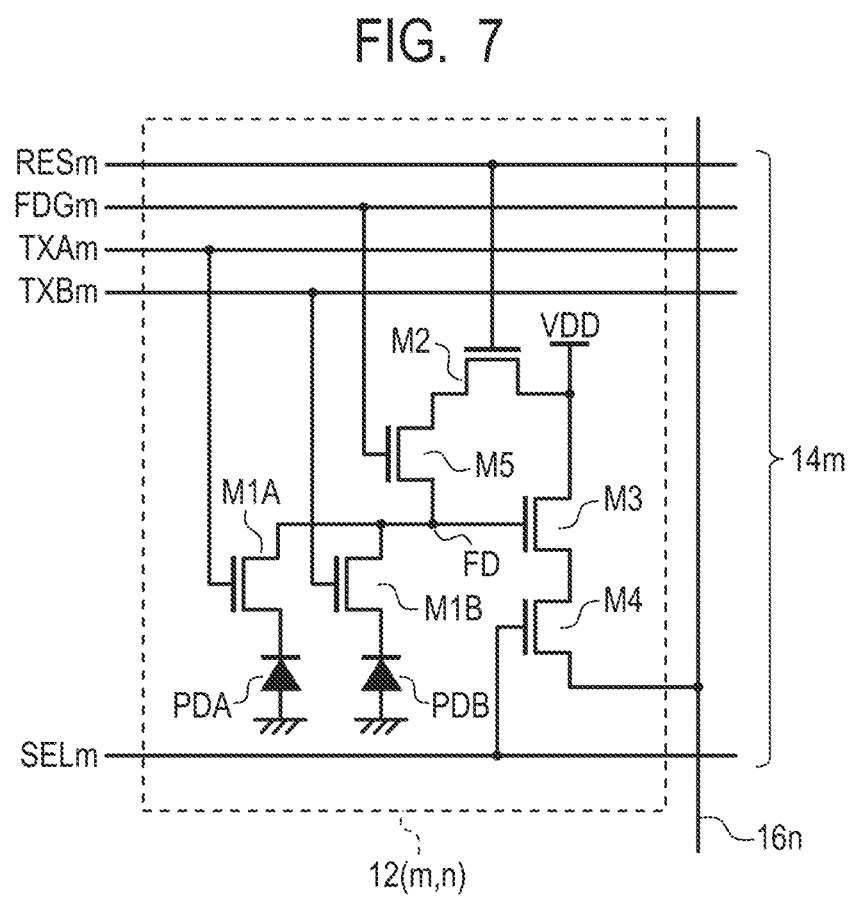
Figure 8:
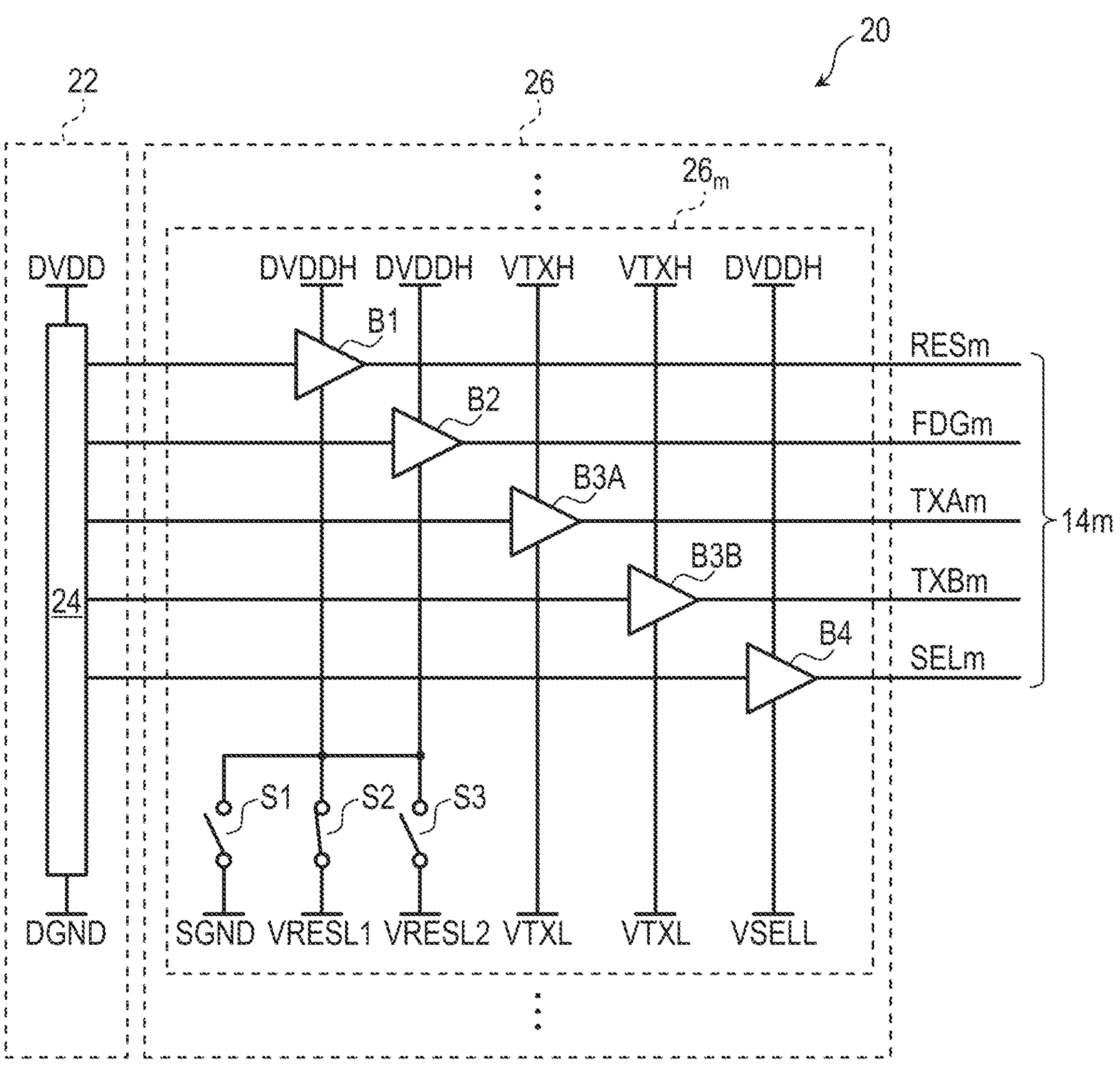
FIG. 8 is a block diagram illustrating a configuration example of a vertical driving circuit of the photoelectric conversion device according to the second embodiment.
Figure 9:
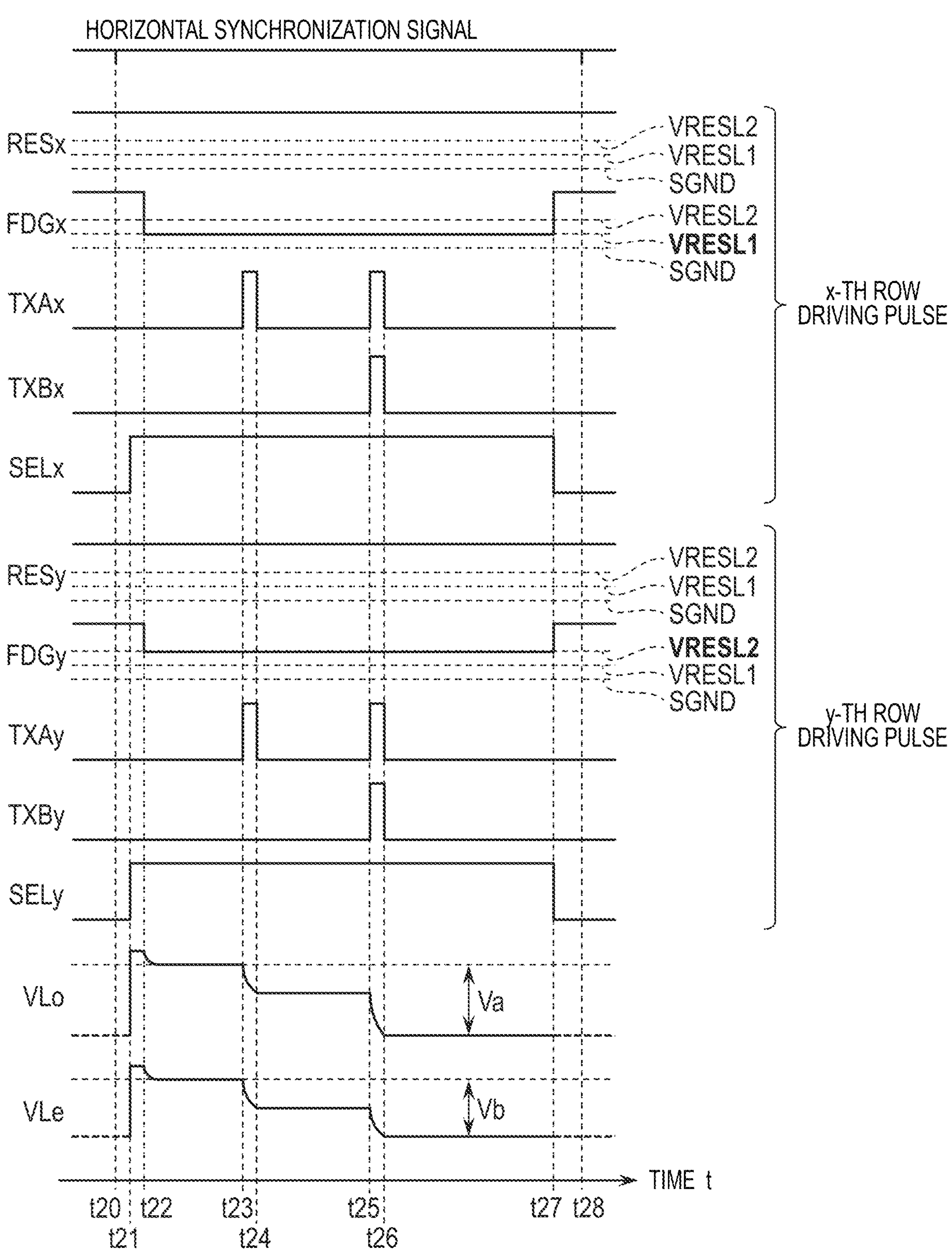
FIG. 9 and FIG. 10 are timing charts illustrating a method of driving the photoelectric conversion device according to the second embodiment.
Figure 10:
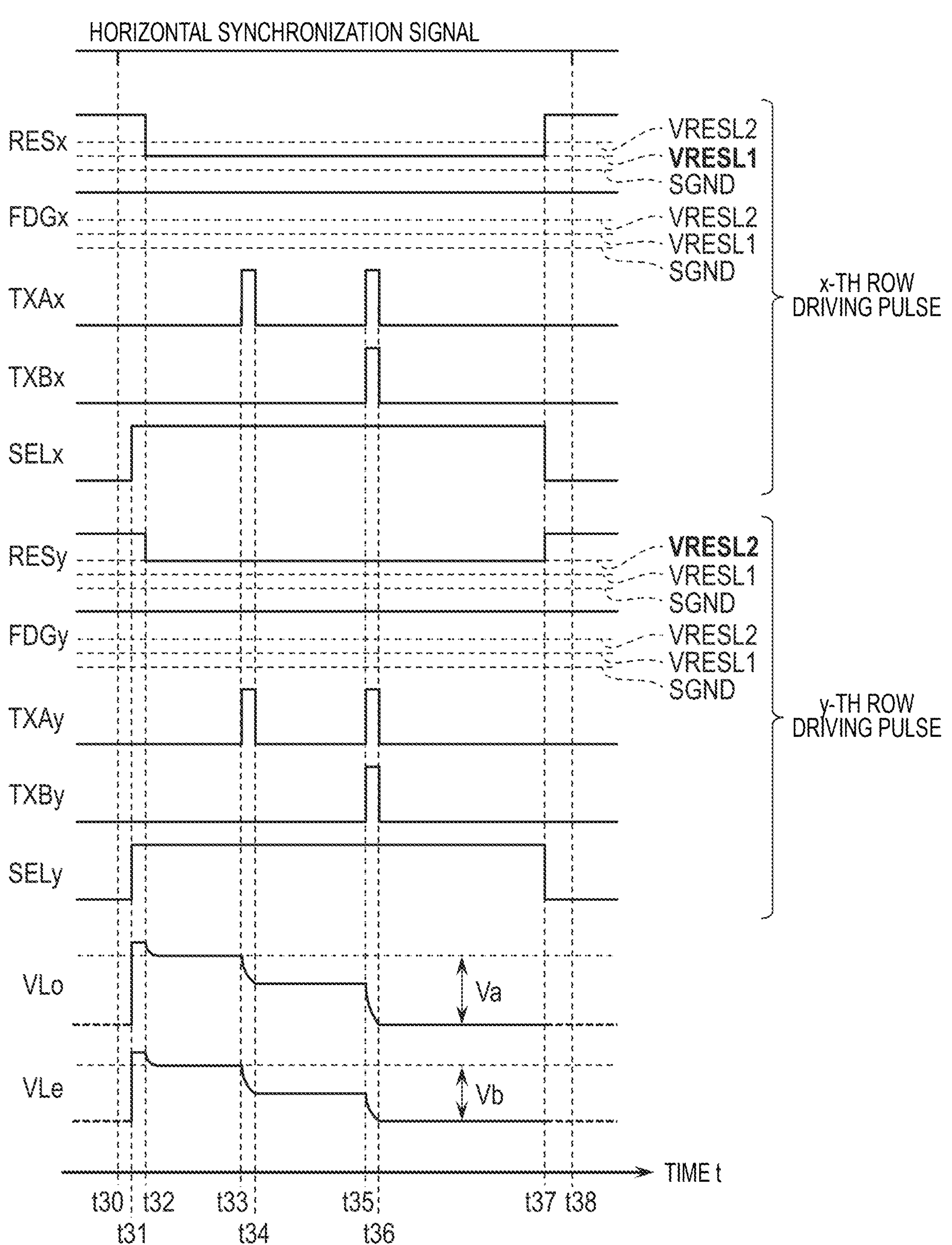

A photoelectric conversion device and a method of driving the same according to a second embodiment of the present invention will be described with reference to FIG. 7 to FIG. 10. The same components as those of the photoelectric conversion device according to the first embodiment are denoted by the same reference numerals, and description thereof will be omitted or simplified. FIG. 7 is an equivalent circuit diagram illustrating a configuration example of a pixel of a photoelectric conversion device according to the present embodiment. FIG. 8 is a block diagram illustrating a configuration example of a vertical driving circuit of the photoelectric conversion device according to the present embodiment. FIG. 9 and FIG. 10 are timing charts illustrating a method of driving the photoelectric conversion device according to the present embodiment.

The photoelectric conversion device according to the present embodiment is basically the same as the photoelectric conversion device according to the first embodiment except that the configuration of the pixel 12 and the vertical driving circuit 20 is different. In the present embodiment, differences of the photoelectric conversion device according to the present embodiment from the first embodiment will be mainly described, and description of the same points as those of the first embodiment will be appropriately omitted.

A pixel 12(m, n) of the photoelectric conversion device according to the present embodiment includes, as illustrated in, e.g., FIG. 7, photoelectric conversion elements PDA and PDB, transfer transistors M1A and M1B, the reset transistor M2, the amplifier transistor M3, and the select transistor M4. The pixel 12(m, n) further includes an FD capacitance switching transistor M5. The photoelectric conversion element PDA and the photoelectric conversion element PDB of one pixel 12 may be configured to receive light passing through different pupil regions of one microlens.

The photoelectric conversion element PDA includes an anode connected to the ground voltage node and a cathode connected to a source of the transfer transistor M1A. The photoelectric conversion element PDB includes an anode connected to the ground voltage node and a cathode connected to a source of the transfer transistor M1B. Drains of the transfer transistors M1A and M1B are connected to a source of the FD capacitance switching transistor M5 and the gate of the amplifier transistor M3. A node FD to which the drains of the transfer transistors M1A and M1B, the source of the FD capacitance switching transistor M5, and the gate of the amplifier transistor M3 are connected is a floating diffusion. The drain of the FD capacitance switching transistor M5 is connected to the source of the reset transistor M2. The drain of the reset transistor M2 and the drain of the amplifier transistor M3 are connected to the power supply voltage node to which the power supply voltage (voltage VDD) is supplied. The source of the amplifier transistor M3 is connected to the drain of the select transistor M4. The source of the select transistor M4 is connected to the output line group 16n.

In the case of the pixel configuration of FIG. 7, the control line group 14 of each row includes five control lines including a control line connected to the gate of the transfer transistor M1A, a control line connected to the gate of the transfer transistor M1B, a control line connected to the gate of the reset transistor M2, a control line connected to the gate of the select transistor M4, and a control line connected to the gate of the FD capacitance switching transistor M5. The control signal TXAm is supplied from the vertical driving circuit 20 to the gate of the transfer transistor M1A. The control signal TXBm is supplied from the vertical driving circuit 20 to the gate of the transfer transistor M1B. The control signal RESm is supplied from the vertical driving circuit 20 to the gate of the reset transistor M2. The control signal SELm is supplied from the vertical driving circuit 20 to the gate of the select transistor M4. The control signal FDGm is supplied from the vertical driving circuit 20 to the gate of the FD capacitance switching transistor M5. In the case where each transistor is formed of an n-channel MOS transistor, the corresponding transistor is turned on when a high-level control signal is supplied from the vertical driving circuit 20. When a low-level control signal is supplied from the vertical driving circuit 20, the corresponding transistor is turned off.

The photoelectric c conversion elements PDA and PDB convert (photoelectrically convert) the incident light into charge of an amount corresponding to the amount of the incident light and accumulate the generated charge. The transfer transistor M1A transfers the charge held by the photoelectric conversion element PDA to the node FD by turning on. The transfer transistor M1B transfers the charge held by the photoelectric conversion element PDB to the node FD by turning on. The charges transferred from the photoelectric conversion elements PDA and PDB are held by the capacitance component (floating diffusion capacitance) of the node FD. As a result, the node FD becomes a potential corresponding to the amount of charges transferred from the photoelectric conversion elements PDA and PDB by charge-voltage conversion by the floating diffusion capacitance.

The FD capacitance switching transistor M5 has a function of switching the capacitance value (floating diffusion capacitance) of the node FD. When the FD capacitance switching transistor M5 is turned on, its channel capacitance is added to the capacitance of the node FD. Accordingly, the capacitance value of the floating diffusion when the FD capacitance switching transistor M5 is the on-state becomes larger than the capacitance value of the floating diffusion when the FD capacitance switching transistor M5 is the off-state. As described above, the pixel 12 of the present embodiment is configured such that the conversion efficiency of the output signal may be switched by making the capacitance value of the node FD variable by the FD capacitance switching transistor M5. In addition, the FD capacitance switching transistor M5 also has a function as an amplitude limiting unit that limits a range of a signal amplitude that a signal output to the output line group 16*n* can take. The connection relationship and operation of the other constituent elements in the pixel 12 of the present embodiment are the same as those of the pixel 12 of the first embodiment.

The pixel 12(*m, n*) of the photoelectric conversion device according to the present embodiment includes, as illustrated in, e.g., FIG. 7, the photoelectric conversion elements PDA and PDB, the transfer transistors M1A and M1B, the reset transistor M2, the amplifier transistor M3, and the select transistor M4. The pixel 12(*m, n*) further includes the FD capacitance switching transistor M5.

The vertical driving circuit 20 of the photoelectric conversion device according to the present embodiment differs from the first embodiment in the configuration of the buffer unit $\mathbf{26}_m$ as the control signal supplied to the pixel 12 increases. That is, the buffer unit $\mathbf{26}_m$ of the present embodiment may include, as illustrated in, e.g., FIG. 8, buffer circuits B1, B2, B3A, B3B, and B4, and switches S1, S2, and S3. The buffer circuit B1 is configured to buffer a control signal supplied from the vertical scanning unit 24 and output the control signal as a control signal RESm to a corresponding control line of the control line group 14*m*. The buffer circuit B2 is configured to buffer the control signal supplied from the vertical scanning unit 24 and output the control signal FDGm to a corresponding control line of the control line group 14*m*. The buffer circuit B3A is configured to buffer a control signal supplied from the vertical scanning unit 24 and output the control signal as a control signal TXAm to a corresponding control line of the control line group 14*m*. The buffer circuit B3B is configured to buffer the control signal supplied from the vertical scanning unit 24 and output the control signal as a control signal TXBm to a corresponding control line of the control line group 14*m*. The buffer circuit B4 is configured to buffer a control signal supplied from the vertical scanning unit 24 and output the control signal as a control signal SELm to a corresponding control line of the control line group 14*m*.

The power supply voltage DVDDH is supplied to a high-level-side voltage node of the buffer circuit B2. A low-level-side voltage node of the buffer circuit B2 is supplied with the ground voltage SGND via the switch S1, the voltage VRESL1 via the switch S2, or the voltage VRESL2 via the switch S3. With this configuration, high-level of the control signal FDGm supplied to the pixel 12(*m, n*) becomes the power supply voltage DVDDH. Low-level of the control signal FDGm may be selected from three types of voltages, i.e., the ground voltage SGND, the voltage VRESL1, and the voltage VRESL2, according to the connection of the switches S1 to S3. More specifically, by individually setting the connection of the switches S1 to S3 for each row, low-level of the control signal FDGm may be changed for each row.

The voltage VTXH is supplied to a high-level-side voltage node of the buffer circuit B3A. The voltage VTXL is supplied to a low-level-side voltage node of the buffer circuit B3A. By adopting this configuration, high-level of the control signal TXAm supplied to the pixel 12(*m, n*) becomes the voltage VTXH, and low-level of the control signal TXm becomes the voltage VTXL. Similarly, the voltage VTXH is supplied to a high-level-side voltage node of the buffer circuit B3B. The voltage VTXL is supplied to a low-level-side voltage node of the buffer circuit B3B. By adopting this configuration, high-level of the control signal TXBm supplied to the pixel 12(*m, n*) becomes the voltage VTXH, and low-level of the control signal TXm becomes the voltage VTXL.

The connection relationship and the operation of the buffer circuit B1 and the buffer circuit B4 are the same as those in the first embodiment.

Next, a method of driving the photoelectric conversion device according to the present embodiment will be described with reference to FIG. 9 and FIG. 10. FIG. 9 is a timing chart in an operation mode in which the FD capacitance switching transistor M5 is operated in the off-state, and FIG. 10 is a timing chart in an operation mode in which the FD capacitance switching transistor M5 is operated in the on-state.

FIG. 9 and FIG. 10 illustrate the transitions of the waveforms of the respective signals in one horizontal period corresponding to time t1 in FIG. 4 and FIG. 5. The control signals RESx, FDGx, TXAx, TXBx, and SELx are control signals supplied to the pixels 12 in the x-th row that output display signals. The control signals RESy, FDGy, TXAy, TXBy, and SELy are control signals supplied to the pixels 12 in the y-th row that output sensing signals. The voltage VLo is a voltage of the output line 16*n*A from which the display signal is output from the pixel 12(*x, n*) in the odd-numbered row. The voltage VLe is a voltage of the output line 16*n*B from which the sensing signal is output from the pixel 12(*y, n*) in the even-numbered row. Note that the control signals RESx, FDGx, TXAx, TXBx, SELx, RESy, FDGy, TXAy, TXBy and SELy are active at high-level and inactive at low-level.

First, an operation mode in which the FD capacitance switching transistor M5 is operated in the off-state will be described with reference to FIG. 9.

A period from time t20 to time t28 corresponds to a readout period of the pixel 12(*x, n*) and the pixel 12(*y, n*), and signal readout from the photoelectric conversion elements PDA and PDB of the pixel 12(*x, n*) and the pixel 12(*y, n*) is performed. During this period, the control signals RESx and RESy are maintained at high-level.

At the time t20, the control signals RESx, RESy, FGDx, and FDGy are at high-level. Accordingly, the reset transistor M2 and the FD capacitance switching transistor M5 of the pixel 12(*x, n*) and the pixel 12(*y, n*) are in the on-state, and the node FD of the pixel 12 is in the reset state.

At the subsequent time t21, the control signals SELx and SELy are controlled from low-level to high-level. Accordingly, the select transistor M4 of the pixel 12(*x, n*) is turned on, and the pixel 12(*x, n*) is electrically connected to the output line 16*n*A. In addition, the select transistor M4 of the pixel 12(*y, n*) is turned on, and the pixel 12(*y, n*) is electrically connected to the output line 16*n*B.

At the subsequent time t22, the control signals FDGx and FDGy are controlled from high-level to low-level. Accordingly, the FD capacitance switching transistors M5 of the pixel 12(*x, n*) and the pixel 12(*y, n*) are turned off, and the reset state of the node FD is released. At this time, by setting the switches S1 and S3 of the buffer circuit $\mathbf{26}_x$ to the off-state and the switch S2 to the on-state, low-level of the FD capacitance switching transistor M5 of the pixel 12(*x, n*) is set to the voltage VRESL1. Further, by setting the switches S1 and S2 of the buffer circuit $\mathbf{26}_y$ to the off-state and the switch S3 to the on-state, low-level of the FD capacitance switching transistor M5 of the pixel 12(*y, n*) is set to the voltage VRESL2, which is a voltage relatively higher than the voltage VRESL1.

In the subsequent period from time t23 to time t24, the control signals TXAx and TXAy are controlled from low-level to high-level. As a result, the transfer transistor M1A of the pixel 12(*x, n*) is turned on, and the charge accumulated in the photoelectric conversion elements PDA of the pixel 12(*x, n*) is transferred to the nodes FD of the pixel 12(*x, n*), and the transfer transistor M1A of the pixel 12(*y, n*) is turned on, and the charge accumulated in the photoelectric conversion elements PDA of the pixel 12(*y, n*) is transferred to the nodes FD of the pixel 12(*y, n*).

In the subsequent period from time t25 to time t26, the control signals TXAx, TXAy, TXBx, and TXBy are controlled from low-level to high-level. Accordingly, the transfer transistors M1A and M1B of the pixel 12(*x, n*) are turned on, and the charges accumulated in the photoelectric conversion elements PDA and PDB of the pixel 12(*x, n*) are transferred to the node FD of the pixel 12(*x, n*), and the transfer transistors M1A and M1B of the pixel 12(*y, n*) are turned on, and the charges accumulated in the photoelectric conversion elements PDA and PDB of the pixel 12(*y, n*) are transferred to the node FD of the pixel 12(*y, n*).

In this manner, the pixel signal based on the two photoelectric conversion elements PDA and PDB included in the pixel 12 is divided into a pixel signal based on the charge of one photoelectric conversion element PDA and a pixel signal based on the total charge of the two photoelectric conversion elements PDA and PDB to be acquired. In this way, it is possible to acquire a signal for focus detection at the same time as acquiring an image signal. Specifically, the pixel signal based on the charge of the photoelectric conversion element PDA is used for focus detection, and the pixel signal based on the total charge of the photoelectric conversion elements PDA and PDB is used as an imaging or display image.

Here, the range of the signal amplitude that can be taken by the output lines 16*n*A and 16*n*B after time t26 will be described.

When the voltage of the node FD drops according to the amount of charges generated in the photoelectric conversion elements PDA and PDB, the gate-source voltage (voltage VGS) of the FD capacitance switching transistor M5 increases accordingly. When the voltage VGS exceeds a certain value, the FD capacitance switching transistor M5 is turned on, and a part of the charge transferred to the node FD is discharged to the power supply node via the FD capacitance switching transistor M5 and the reset transistor M2 in the on-state. The operation of the FD capacitance switching transistor M5 is the same as that of the reset transistor M2 functioning as a circuit for limiting the signal amplitude of the node FD in the first embodiment.

Here, low-level of the control signal FDGy supplied to the pixel 12(*y, n*) is the voltage VRESL2, which is higher than the voltage VRESL1 of low-level of the control signal FDGx supplied to the pixel 12(*x, n*). In other words, the gate potential at the time of controlling the FD capacitance switching transistor M5 of the pixel 12(*x, n*) to the off-state is deeper than the gate potential at the time of controlling the FD capacitance switching transistor M5 of the pixel 12(*y, n*) to the off-state. That is, the potential difference between the gate potential when the FD capacitance switching transistor M5 is controlled to the off-state and the gate potential when the FD capacitance switching transistor M5 is controlled to the on-state is larger in the pixel 12(*x, n*) than in the pixel 12(*y, n*).

Therefore, the signal amplitude of the node FD that can be taken by the pixel 12(*y, n*) becomes smaller than the signal amplitude of the node FD that can be taken by the pixel 12(*x, n*) as described above. In other words, the signal amplitude of the node FD of the pixel 12(*y, n*) is limited more than the signal amplitude of the node FD of the pixel 12(*x, n*).

From the above, the signal amplitude (voltage Vb) that the output line 16*n*B can take is smaller than the signal amplitude (voltage Va) that the output line 16*n*A can take. Accordingly, for example, when the display signal of the x-th row is the low luminance signal and the sensing signal of the y-th row is the high luminance signal, the voltage drop amount of the output line 16*n*B from which the high luminance signal of the y-th row is read out is limited. As a result, it is possible to suppress the influence of crosstalk via the parasitic capacitance from the output line 16*n*B from which the high-luminance signal of the y-th row is read out to the output line 16*n*A from which the low-luminance signal of the x-th row is read out, and it is possible to obtain a high-quality display image.

Next, an operation mode in which the FD capacitance switching transistor M5 is operated in the on-state will be described with reference to FIG. 10.

A period from time t30 to time t38 corresponds to a readout period of the pixel 12(*x, n*) and the pixel 12(*y, n*), and signal readout from the photoelectric conversion elements PDA and PDB of the pixel 12(*x, n*) and the pixel 12(*y, n*) is performed. During this period, the control signals FDGx and FDGy are maintained at high-level.

At time the t30, the control signals RESx, RESy, FGDx, and FDGy are at high-level. Accordingly, the reset transistor M2 and the FD capacitance switching transistor M5 of the pixel 12(*x, n*) and the pixel 12(*y, n*) are in the on-state, and the node FD of the pixel 12 is in the reset state.

At the subsequent time t31, the control signals SELx and SELy are controlled from low-level to high-level. Accordingly, the select transistor M4 of the pixel 12(*x, n*) is turned on, and the pixel 12(*x, n*) is electrically connected to the output line 16*n*A. In addition, the select transistor M4 of the pixel 12(*y, n*) is turned on, and the pixel 12(*y, n*) is electrically connected to the output line 16*n*B.

At the subsequent time t32, the control signals RESx and RESy are controlled from high-level to low-level. Accordingly, the reset transistors M2 of the pixel 12(*x, n*) and the pixel 12(*y, n*) are turned off, and the reset state of the nodes FD is released. At this time, by setting the switches S1 and S3 of the buffer circuit $\mathbf{26}_x$ to the off-state and the switch S2 to the on-state, low-level of the reset transistor M2 of the pixel 12(*x, n*) is set to the voltage VRESL1. Further, by setting the switches S1 and S2 of the buffer circuit 26*y* to the off-state and the switch S3 to the on-state, low-level of the reset transistor M2 of the pixel 12(*y, n*) is set to the voltage VRESL2, which is a voltage relatively higher than the voltage VRESL1.

With this setting, when the FD capacitance switching transistor M5 is operated in the on-state, as described in the first embodiment, the reset transistor M2 functions as a circuit that limits the signal amplitude of the node FD. As a result, it is possible to suppress the influence of crosstalk via the parasitic capacitance from the output line 16*n*B to the output line 16*n*A.

As described above, even when the FD capacitance switching transistor M5 is operated in either of the on-state and the off-state in the pixel 12 to which the FD capacitance switching transistor M5 is added, it is possible to suppress the influence of crosstalk via the parasitic capacitance from the output line 16*n*B to the output line 16*n*A. This makes it possible to obtain a high-quality display image.

As described above, according to the present embodiment, it is possible to acquire a display signal having excellent image quality while acquiring a sensing signal at high speed.

Third Embodiment

Figure 11:
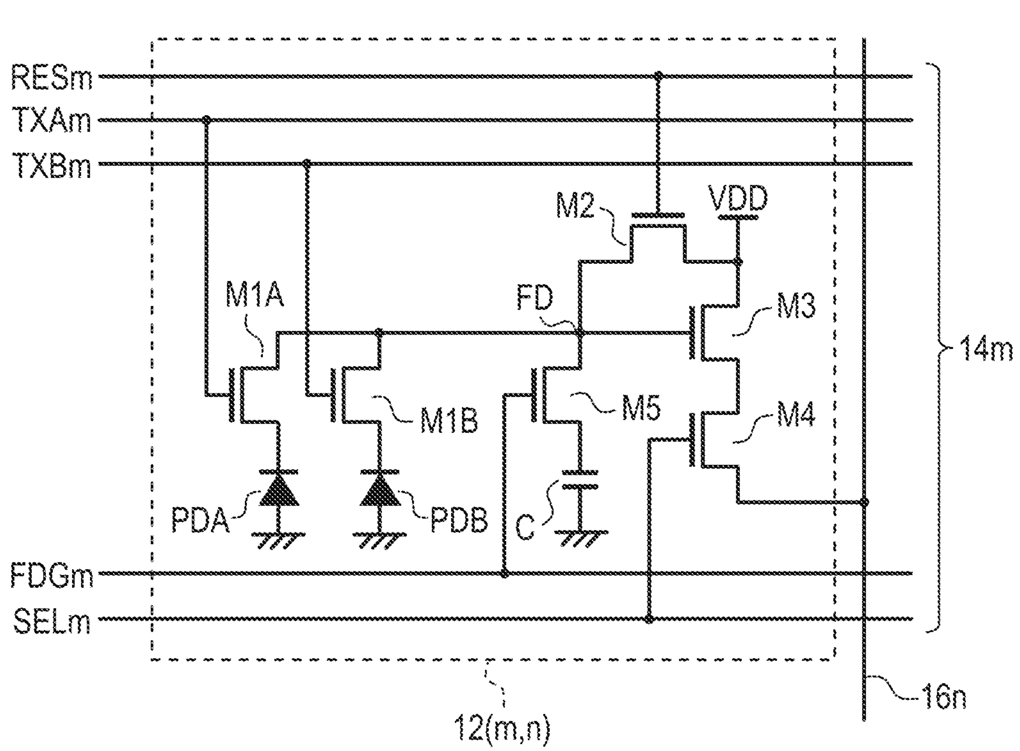
FIG. 11 is an equivalent circuit diagram illustrating a configuration example of a pixel of a photoelectric conversion device according to a third embodiment.
Figure 12:
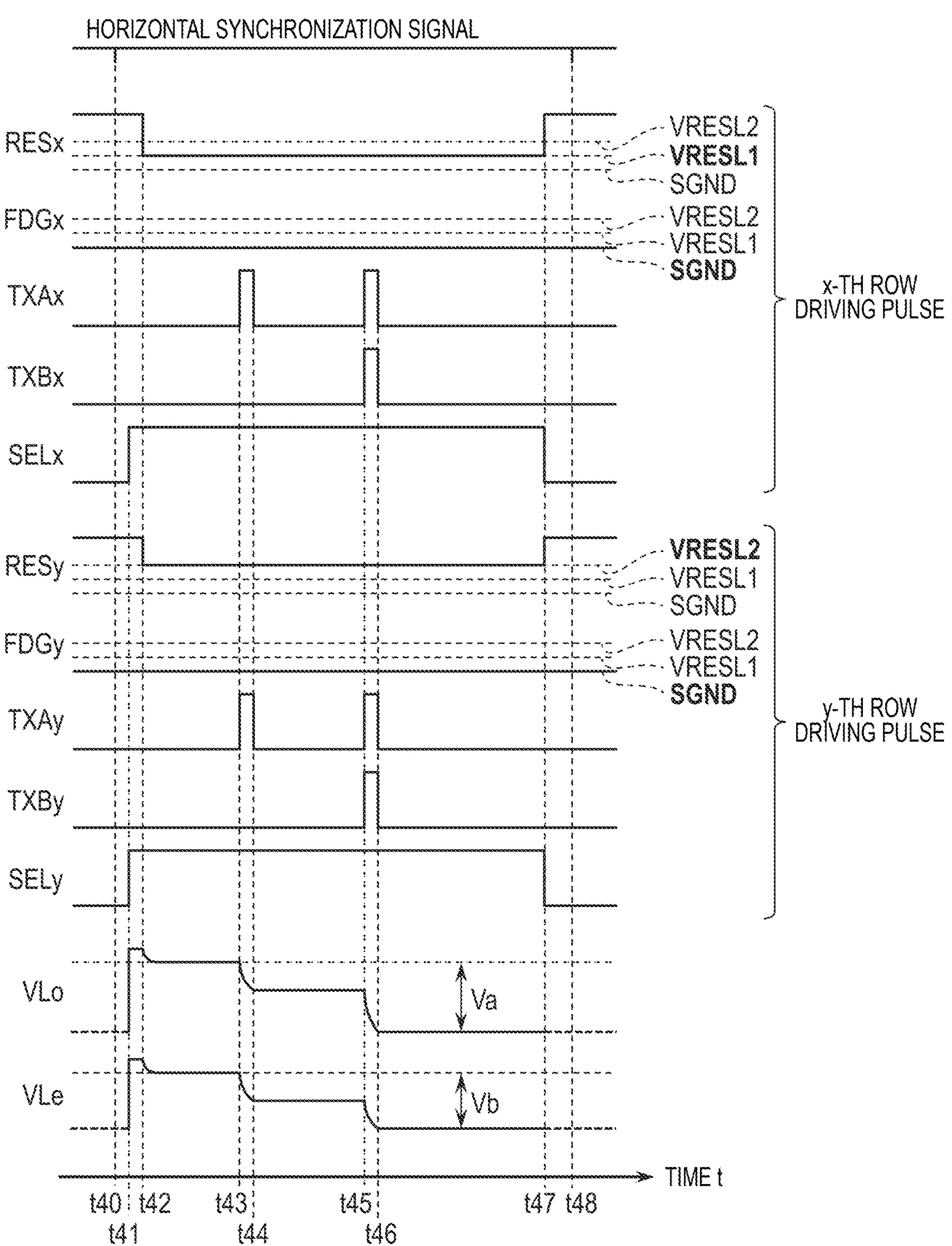
FIG. 12 is a timing chart illustrating a method of driving the photoelectric conversion device according to the third embodiment.

A photoelectric conversion device and a method of driving the same according to a third embodiment of the present invention will be described with reference to FIG. 11 and FIG. 12. The same components as those of the photoelectric conversion device according to the first or second embodiment are denoted by the same reference numerals, and description thereof will be omitted or simplified. FIG. 11 is an equivalent circuit diagram illustrating a configuration example of a pixel of a photoelectric conversion device according to the present embodiment. FIG. 12 is a timing chart illustrating a method of driving the photoelectric conversion device according to the present embodiment.

The photoelectric conversion device according to the present embodiment is basically the same as the photoelectric conversion device according to the first or second embodiment except that the configuration of the pixel 12 is different. In the present embodiment, differences between the photoelectric conversion device according to the present embodiment and the first or second embodiment will be mainly described, and description of the same points as those of the first or second embodiment will be appropriately omitted.

The pixel 12(*m, n*) of the photoelectric conversion device according to the present embodiment is different from that of the second embodiment in that, as illustrated in, e.g., FIG. 11, the FD capacitance switching transistor M5 is added not between the reset transistor M2 and the node FD but as a ground capacitance. The present embodiment is similar to the second embodiment in that a plurality of photoelectric conversion elements PDA and PDB and a plurality of transfer transistors M1A and M1B are provided.

A drain of the FD capacitance switching transistor M5 is connected to the node FD. A source of the FD capacitance switching transistor M5 is connected to the ground voltage node. In FIG. 11, a capacitance component added to the node FD when the FD capacitance switching transistor M5 is turned on is represented as a capacitor C. The source of the reset transistor M2 is connected to the node FD as in the first embodiment. Similarly to the second embodiment, the FD capacitance switching transistor M5 also functions as an amplitude limiting unit that limits the range of the signal amplitude in which the signal output to the output line group 16*n* can take. The other constituent elements of the pixel 12 and the vertical driving circuit 20 are the same as those of the second embodiment.

Next, a method of driving the photoelectric conversion device according to the present embodiment will be described with reference to FIG. 12. FIG. 12 is a timing chart in an operation mode in which the FD capacitance switching transistor M5 is operated in the off-state.

FIG. 12 illustrates the transition of the waveform of each signal in one horizontal period corresponding to time t1 in FIG. 4 and FIG. 5. The control signals RESx, FDGx, TXAx, TXBx, and SELx are control signals supplied to the pixels 12 in the x-th row that output display signals. The control signals RESy, FDGy, TXAy, TXBy, and SELy are control signals supplied to the pixels 12 in the y-th row that output sensing signals. The voltage VLo is a voltage of the output line 16*n*A from which the display signal is output from the pixels 12(*x, n*) in the odd-numbered rows. The voltage VLe is a voltage of the output line 16*n*B from which the sensing signal is output from the pixels 12(*y, n*) in the even-numbered rows. Note that the control signals RESx, FDGx, TXAx, TXBx, SELx, RESy, FDGy, TXAy, TXBy and SELy are active at high-level and inactive at low-level.

First, an operation mode in which the FD capacitance switching transistor M5 is operated in the off-state will be described with reference to FIG. 12.

A period from time t40 to time t48 corresponds to a readout period of the pixel 12(*x, n*) and the pixel 12(*y, n*), and signal readout from the photoelectric conversion elements PDA and PDB of the pixel 12(*x, n*) and the pixel 12(*y, n*) is performed. During this period, the control signals FDGx and FDGy are maintained at low-level (ground voltage SGND).

Under this condition, as in the first embodiment, the reset transistor M2 functions as a circuit that limits the signal amplitude of the node FD, and the influence of crosstalk via the parasitic capacitance from the output line 16*n*B to the output line 16*n*A may be suppressed.

Since the operation mode in which the FD capacitance switching transistor M5 is operated in the on-state is the same as the operation of the second embodiment described with reference to FIG. 10, the description thereof will be omitted here.

As described above, even when the FD capacitance switching transistor M5 is operated in either of the on-state and the off-state in the pixel 12 to which the FD capacitance switching transistor M5 is added, it is possible to suppress the influence of crosstalk via the parasitic capacitance from the output line 16*n*B to the output line 16*n*A. This makes it possible to obtain a high-quality display image.

As described above, according to the present embodiment, it is possible to acquire a display signal having excellent image quality while acquiring a sensing signal at high speed.

Fourth Embodiment

Figure 13:
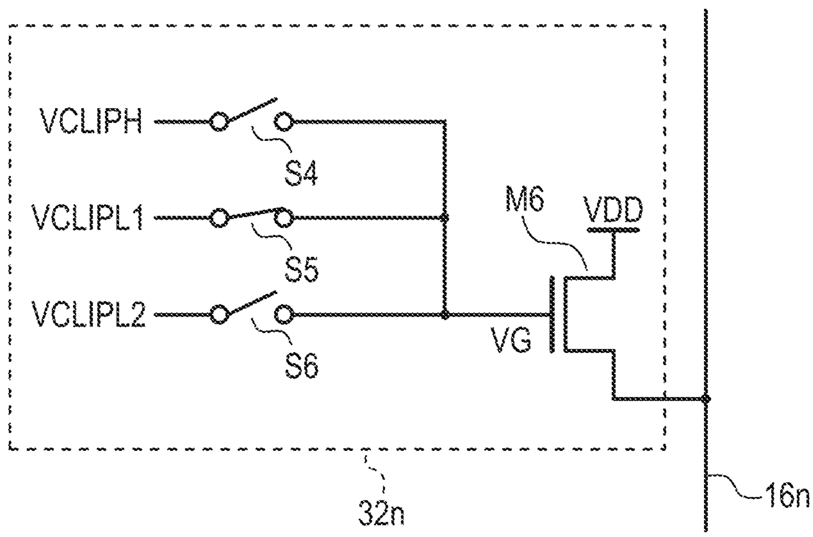
FIG. 13 is a circuit diagram illustrating a configuration example of an amplitude limiting circuit of a photoelectric conversion device according to a fourth embodiment.
Figure 14:
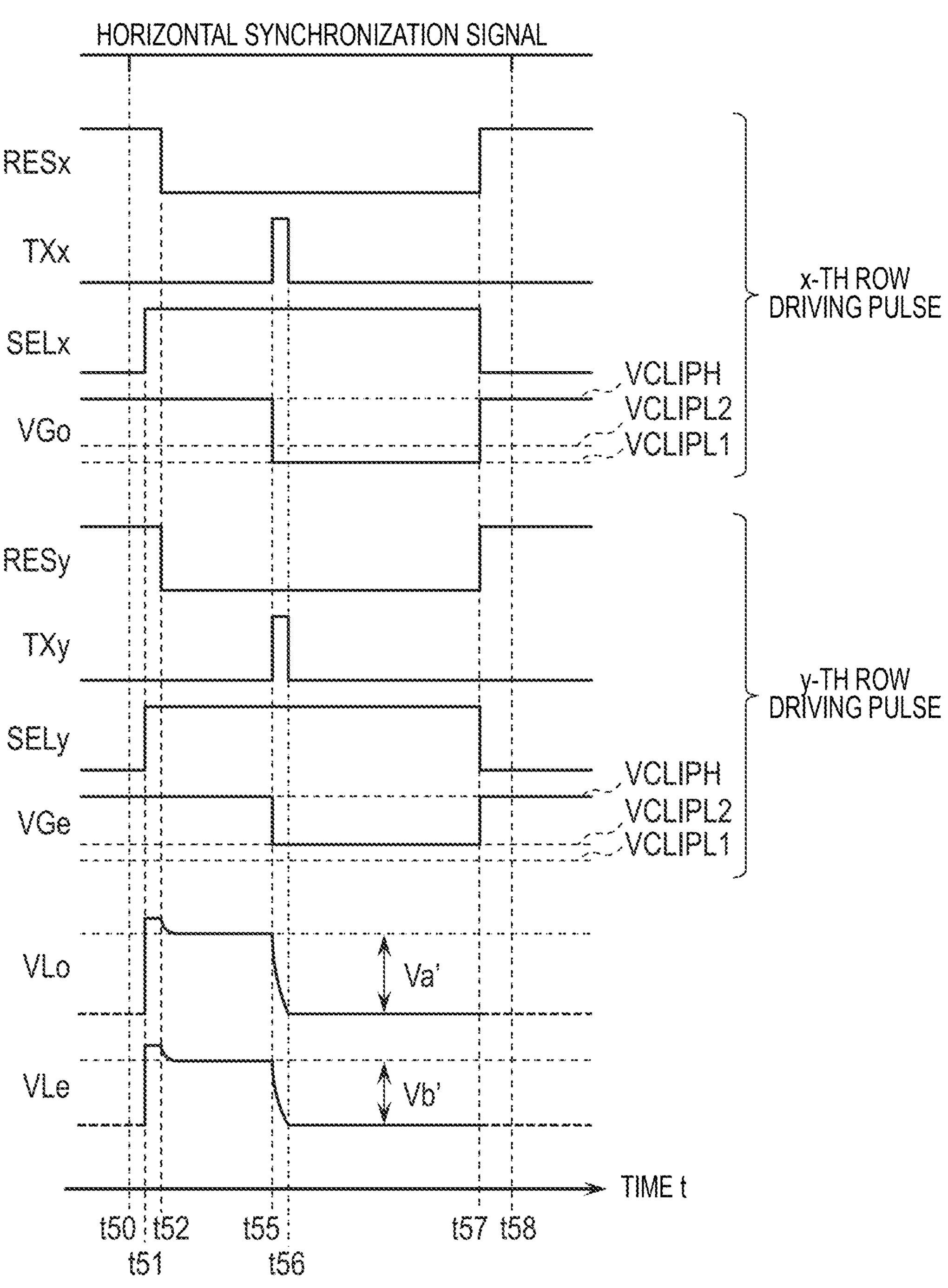
FIG. 14 is a timing chart illustrating a method of driving the photoelectric conversion device according to the fourth embodiment.

A photoelectric conversion device and a method of driving the same according to a fourth embodiment of the present invention will be described with reference to FIG. 13 and FIG. 14. The same components as those of the photoelectric conversion devices according to the first to third embodiments are denoted by the same reference numerals, and description thereof will be omitted or simplified. FIG. 13 is a circuit diagram illustrating a configuration example of an amplitude limiting circuit of a photoelectric conversion device according to the present embodiment. FIG. 14 is a timing chart illustrating a method of driving the photoelectric conversion device according to the present embodiment.

In the photoelectric conversion devices according to the first to third embodiments, the reset transistor M2 and the FD capacitance switching transistor M5 included in the pixel 12 function as a circuit that limits the signal amplitude of the node FD, thereby limiting the signal amplitude of the output line group 16. In the present embodiment, a photoelectric conversion device configured to limit the signal amplitude of the output line group 16 using an amplitude limiting circuit included in the signal processing unit 30 will be described.

The signal processing unit 30 of the photoelectric conversion device according to the present embodiment includes a plurality of amplitude limiting circuits 32 corresponding to each of the plurality of output lines 16A and 16B constituting the output line group 16 of each column. As illustrated in, e.g., FIG. 13, the amplitude limiting circuit 32*n* arranged in the n-th column includes an amplitude limiting transistor M6 and switches S4, S5, and S6. A source of the amplitude limiting transistor M6 is connected to the output line group 16*n*. A drain of the amplitude limiting transistor M6 is connected to a node to which a fixed voltage, for example, a power supply voltage (voltage VDD) is supplied. A gate of the amplitude limiting transistor M6 is connected to a node to which the voltage VCLIPH is supplied via the switch S4, a node to which the voltage VCLIPL1 is supplied via the switch S5, and a node to which the voltage VCLIPL2 is supplied via the switch S6. The same applies to the amplitude limiting circuits 32 arranged in the other columns. Other configurations of the photoelectric conversion device according to the present embodiment are the same as those of the photoelectric conversion device according to the first embodiment.

By configuring the amplitude limiting circuit 32 as described above, the gate voltage VG of the amplitude limiting transistor M6 may be selected from three types of voltages VCLIPH, VCLIPL1, and VCLIPL2 according to the connection state (conduction or non-conduction) of the switches S4, S5, and S6. More specifically, by individually setting the connection states of the switches S4, S5, and S6 for each row, it is possible to change the range of the signal amplitude of the output line group 16*n* for each row. That is, the amplitude limiting circuit 32 functions as an amplitude limiting unit that limits the range of the signal amplitude that the signal output to the output line group 16*n* can take. The circuit configuration of FIG. 13 is merely an example, and the circuit configuration of the amplitude limiting circuit 32 is not limited thereto. The voltages VCLIPH, VCLIPL1, and VCLIPL2 may be supplied from a reference voltage generation circuit (not illustrated) included in the photoelectric conversion device 100.

Next, a method of driving the photoelectric conversion device according to the present embodiment will be described with reference to FIG. 14. FIG. 14 illustrates the transition of the waveform of each signal in one horizontal period corresponding to time t1 in FIG. 4 and FIG. 5. The control signals RESx, TXx, and SELx are control signals supplied to the pixels 12 in the x-th row that output display signals. The voltage VGo is the gate voltage of the amplitude limiting transistor M6 of the amplitude limiting circuit 32 connected to the output line 16*n*A from which the display signal is output from the pixel 12(*x, n*) in the odd-numbered row. The control signals RESy, TXy, and SELy are control signals supplied to the pixels 12 in the y-th row that output sensing signals. The voltage VGe is the gate voltage of the amplitude limiting transistor M6 of the amplitude limiting circuit 32 connected to the output line 16*n*B from which the sensing signal is output from the pixel 12(*y, n*) in the even-numbered row. The voltage VLo is a voltage of the output line 16*n*A from which the display signal is output from the pixel 12(*x, n*) in the odd-numbered row. The voltage VLe is a voltage of the output line 16*n*B from which the sensing signal is output from the pixel 12(*y, n*) in the even-numbered row. It is assumed that the control signals RESx, TXx, SELx, RESy, TXy, and SELy are in an active state at high-level, and are in an inactive state at low-level.

A period from time t50 to time t58 corresponds to a readout period of the pixel 12(*x, n*) and the pixel 12(*y, n*), and signal readout from the photoelectric conversion elements PD of the pixel 12(*x, n*) and the pixel 12(*y, n*) is performed.

In a period from the time t50 to time t55, the switch S4 of the amplitude limiting circuit 32*n* is controlled to be in a conductive state (on-state), and the gate voltages VGo and VGe of the amplitude limiting transistor M6 are respectively set to the voltage VCLIPH. The voltage VCLIPH is a voltage that limits the amplitude of the N-signal of the output lines 16*n*A and 16*n*B, and is set to a voltage higher than a voltage VCLIPL1 and a voltage VCLIPL2 described later.

In the subsequent period from the time t55 to time t56, the control signals TXx and TXy are controlled from low-level to high-level. Accordingly, the transfer transistor M1 of the pixel 12(*x, n*) is turned on and the charge accumulated in the photoelectric conversion element PD of the pixel 12(*x, n*) is transferred to the node FD, and the transfer transistor M1 of the pixel 12(*y, n*) is turned on and the charge accumulated in the photoelectric conversion element PD of the pixel 12(*y, n*) is transferred to the node FD.

At the time t55, the gate voltage VGo of the amplitude limiting transistor M6 of the amplitude limiting circuit 32 connected to the output line 16*n*A is set to the voltage VCLIPL1. The gate voltage VGe of the amplitude limiting transistor M6 of the amplitude limiting circuit 32 connected to the output line 16*n*B is set to a voltage VCLIPL2, which is relatively higher than the voltage VCLIPL1.

The gate voltages VGo and VGe of the amplitude limiting transistor M6 may be changed for each readout row depending on the connection states of the switches S4, S5, and S6. Specifically, in the x-th row corresponding to the pixel 12(*x, n*), the switch S5 is set to the conductive state, and the voltage VCLIPL1 is supplied to the gate of the amplitude limiting transistor M6. In the y-th row corresponding to the pixel 12(*y, n*), the switch S6 is set to the conductive state, and the voltage VCLIPL2 is supplied to the gate of the amplitude limiting transistor M6. The voltages VCLIPL1 and VCLIPL2 are voltages that limit the amplitudes of the output lines 16*n*A and 16*n*B.

Here, the range of the signal amplitude that can be taken by the output lines 16*n*A and 16*n*B will be described.

When the voltage of the output line group 16*n* drops in accordance with the amount of charge generated in the photoelectric conversion element PD, the gate-source voltage (voltage VGS) of the amplitude limiting transistor M6 increases accordingly. When the voltage VGS exceeds a constant value, the amplitude limiting transistor M6 is turned on, and the voltage of the output line group 16*n* stops decreasing. This is the same operation as the reset transistor M2 and the FD capacitance switching transistor M5 described in the first to third embodiments, and the signal amplitude that the output line group 16*n* can take is limited by the amplitude limiting transistor M6.

Here, the gate voltage VGe of the amplitude limiting transistor M6 of the amplitude limiting circuit 32 connected to the same output line 16*n*B as the pixel 12(*y, n*) is the voltage VCLIPL2. The voltage VCLIPL2 is higher than the voltage VCLIPL1, which is the gate voltage VGo of the amplitude limiting transistor M6 of the amplitude limiting circuit 32 connected to the same output line 16*n*A as the pixel 12(*x, n*). In other words, the gate potential of the amplitude limiting transistor M6 of the amplitude limiting circuit 32 connected to the output line 16*n*A is deeper than the gate potential of the amplitude limiting transistor M6 of the amplitude limiting circuit 32 connected to the output line 16*n*B. That is, the potential difference between the gate potential when controlling the amplitude limiting transistor M6 to the off-state and the gate potential when controlling the amplitude limiting transistor M6 to the on-state is larger in the amplitude limiting transistor M6 corresponding to the output line 16*n*A than in the amplitude limiting transistor M6 corresponding to the output line 16*n*A.

Therefore, the signal amplitude of the output line 16*n*B is limited to be larger than the signal amplitude of the output line 16*n*A on the same principle as the signal amplitude limitation of the node FD by the reset transistor M2 or the FD capacitance switching transistor M5 in the first to third embodiments.

From the above, the signal amplitude (voltage Vb') that the output line 16*n*B can take is smaller than the signal amplitude (voltage Va') that the output line 16*n*A can take. Accordingly, for example, when the display signal of the x-th row is the low luminance signal and the sensing signal of the y-th row is the high luminance signal, the voltage drop amount of the output line 16*n*B from which the high luminance signal of the y-th row is read out is limited. As a result, it is possible to suppress the influence of crosstalk via the parasitic capacitance from the output line 16*n*B from which the high-luminance signal of the y-th row is read out to the output line 16*n*A from which the low-luminance signal of the x-th row is read out, and it is possible to obtain a high-quality display image.

At the subsequent time t57, the switch S4 of the amplitude limiting circuit 32*n* is controlled to be in the conductive state, and the gate voltages VGo and VGe of the amplitude limiting transistors M6 are respectively set to the voltage VCLIPH. Thus, the signal readout operation of the pixel 12(*x, n*) and the pixel 12(*y, n*) is completed.

As described above, according to the present embodiment, it is possible to acquire a display signal having excellent image quality while acquiring a sensing signal at high speed.

Fifth Embodiment

Figure 15:
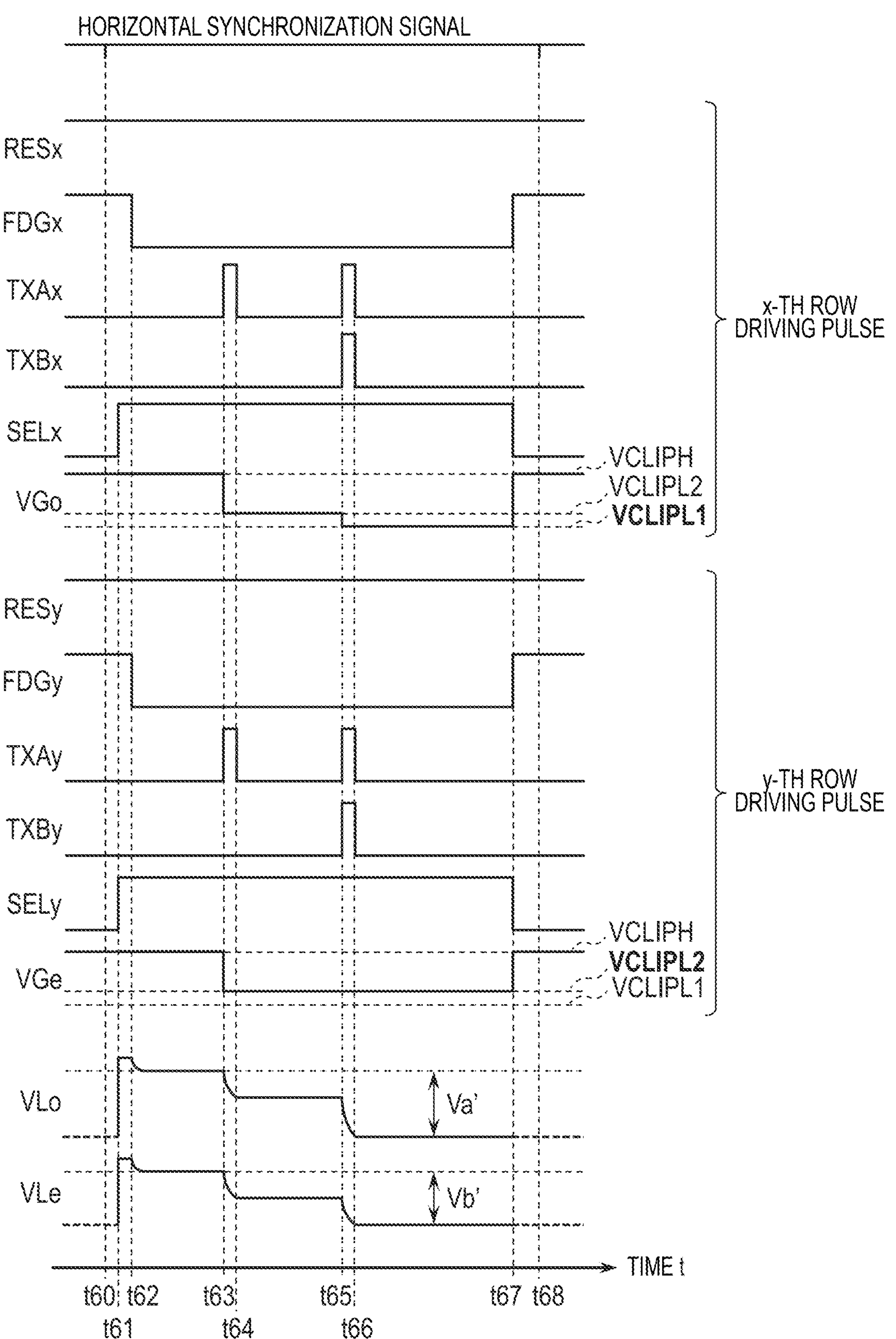
FIG. 15 and FIG. 16 are timing charts illustrating a method of driving the photoelectric conversion device according to a fifth embodiment.
Figure 16:
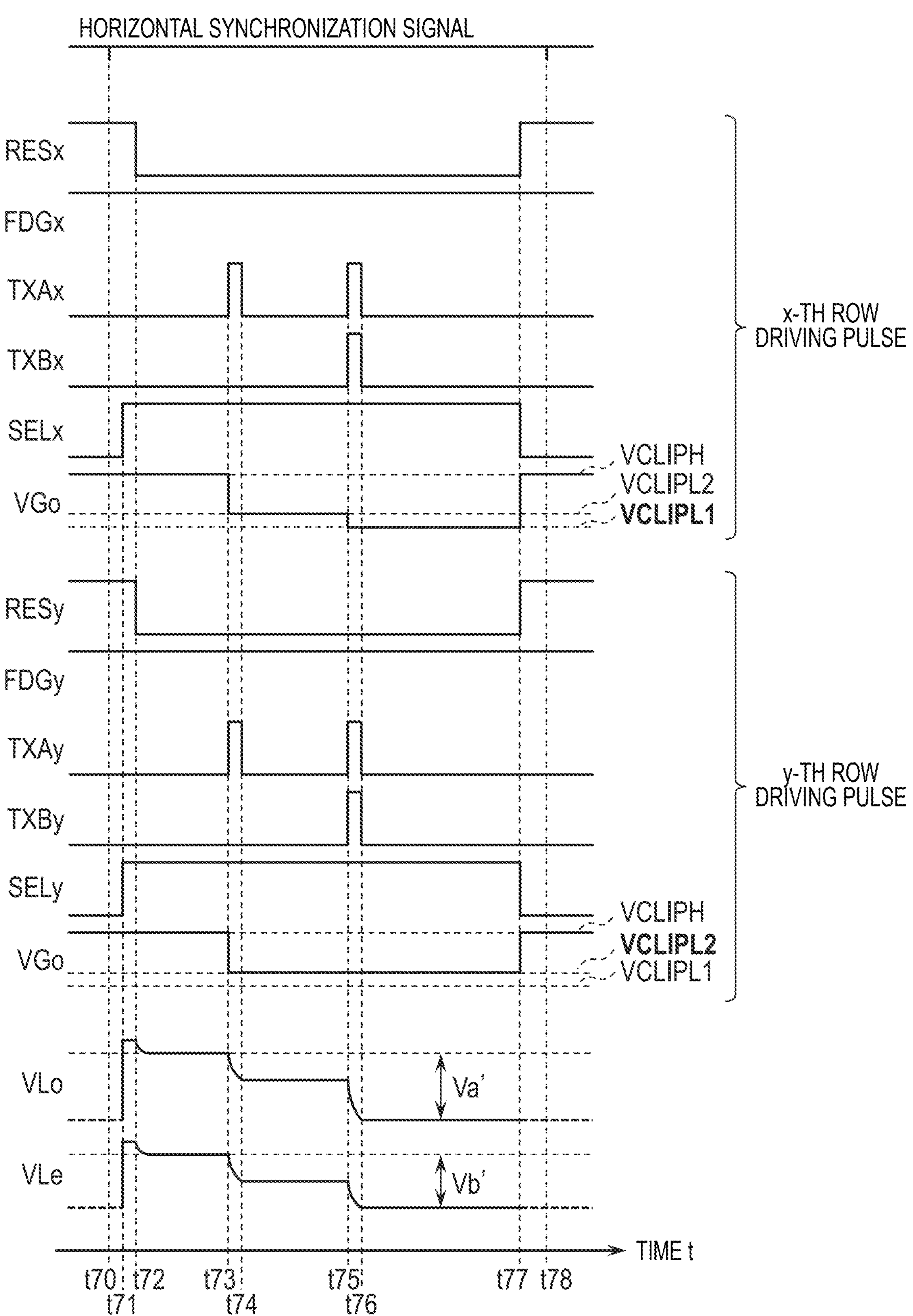

A photoelectric conversion device and a method of driving the same according to a fifth embodiment of the present invention will be described with reference to FIG. 15 and FIG. 16. The same components as those of the photoelectric conversion devices according to the first to fourth embodiments are denoted by the same reference numerals, and description thereof will be omitted or simplified. FIG. 15 and FIG. 16 are timing charts illustrating a method of driving the photoelectric conversion device according to the present embodiment.

In the present embodiment, an example in which the driving method of the fourth embodiment in which the signal amplitude of the output line group 16*n* is limited using the amplitude limiting circuit 32 of the signal processing unit 30 is applied to the photoelectric conversion device according to the second embodiment will be described. The photoelectric conversion device according to the present embodiment is the same as the photoelectric conversion device according to the second embodiment except that the signal processing unit 30 further includes the amplitude limiting circuit 32 described in the fourth embodiment.

FIG. 15 is a timing diagram in an operation mode in which the FD capacitance switching transistor M5 is operated in the off-state, and FIG. 16 is a timing diagram in an operation mode in which the FD capacitance switching transistor M5 is operated in the on-state.

FIG. 15 and FIG. 16 illustrate the transition of the waveform of each signal in one horizontal period corresponding to time t1 in FIG. 4 and FIG. 5. The control signals RESx, FDGx, TXAx, TXBx, and SELx are control signals supplied to the pixels 12 in the x-th row that output display signals. The voltage VGo is the gate voltage of the amplitude limiting transistor M6 of the amplitude limiting circuit 32 connected to the output line 16*n*A from which the display signal is output from the pixel 12(*x, n*) in the odd-numbered row. The control signals RESy, FDGy, TXAy, TXBy, and SELy are control signals supplied to the pixels 12 in the y-th row that output sensing signals. The voltage VGe is the gate voltage of the amplitude limiting transistor M6 of the amplitude limiting circuit 32 connected to the output line 16*n*B from which the sensing signal is output from the pixel 12(*y, n*) in the even-numbered row. The voltage VLo is a voltage of the output line 16*n*A from which the display signal is output from the pixel 12(*x, n*) in the odd-numbered row. The voltage VLe is a voltage of the output line 16*n*B from which the sensing signal is output from the pixel 12(*y, n*) in the even-numbered row. Note that the control signals RESx, FDGx, TXAx, TXBx, SELx, RESy, FDGy, TXAy, TXBy and SELy are active at high-level and inactive at low-level.

First, an operation mode in which the FD capacitance switching transistor M5 is operated in the off-state will be described with reference to FIG. 15.

A period from time t60 to time t68 corresponds to a readout period of the pixel 12(*x, n*) and the pixel 12(*y, n*), and signal readout from the photoelectric conversion elements PDA and PDB of the pixel 12(*x, n*) and the pixel 12(*y, n*) is performed. During this period, the control signals RESx and RESy are maintained at high-level.

In the period from time t65 to time t67, the gate voltage VGe of the amplitude limiting transistor M6 of the amplitude limiting circuit 32 connected to the same output line 16*n*B as the pixel 12(*y, n*) is set to the voltage VCLIPL2. On the other hand, the gate voltage VGo of the amplitude limiting transistor M6 of the amplitude limiting circuit 32 connected to the same output line 16*n*A as the pixel 12(*x, n*) is set to the voltage VCLIPL1 lower than the voltage VCLIPL2. Accordingly, the signal amplitude of the sensing signal output from the pixel 12(*y, n*) to the output line 16*n*B is limited to be larger than the signal amplitude of the display signal output from the pixel 12(*x, n*) to the output line 16*n*A. Therefore, it is possible to suppress the influence of crosstalk via the parasitic capacitance from the output line 16*n*B to the output line 16*n*A.

In the period from time t63 to the time t65, the gate voltage VGo of the amplitude limiting transistor M6 of the amplitude limiting circuit 32 connected to the same output line 16*n*A as the pixel 12(*x, n*) is set to the voltage VCLIPL2. This is to limit the voltage of the signal based on the charge of one photoelectric conversion element PDA, and is set to the voltage VCLIPL2, which is a voltage relatively higher than the voltage VCLIPL1.

Next, an operation mode in which the FD capacitance switching transistor M5 is operated in the on-state will be described with reference to FIG. 16.

A period from time t70 to time t78 corresponds to a readout period of the pixel 12(*x, n*) and the pixel 12(*y, n*), and signal readout from the photoelectric conversion elements PDA and PDB of the pixel 12(*x, n*) and the pixel 12(*y, n*) is performed. During this period, the control signals FDGx and FDGy are maintained at high-level.

Since the timing diagram of FIG. 16 differs from the timing diagram of FIG. 15 only in the control signals RESx, RESy, FDGx, and FDGy, detailed description thereof will be omitted.

In the present embodiment, even when the FD capacitance switching transistor M5 of the pixel 12 to which the FD capacitance switching transistor M5 is added is operated in either the on-state or the off-state, it is possible to suppress the influence of crosstalk via the parasitic capacitance from the output line 16*n*B to the output line 16*n*A. This makes it possible to obtain a high-quality display image.

As described above, according to the present embodiment, it is possible to acquire a display signal having excellent image quality while acquiring a sensing signal at high speed.

Sixth Embodiment

Figure 17:
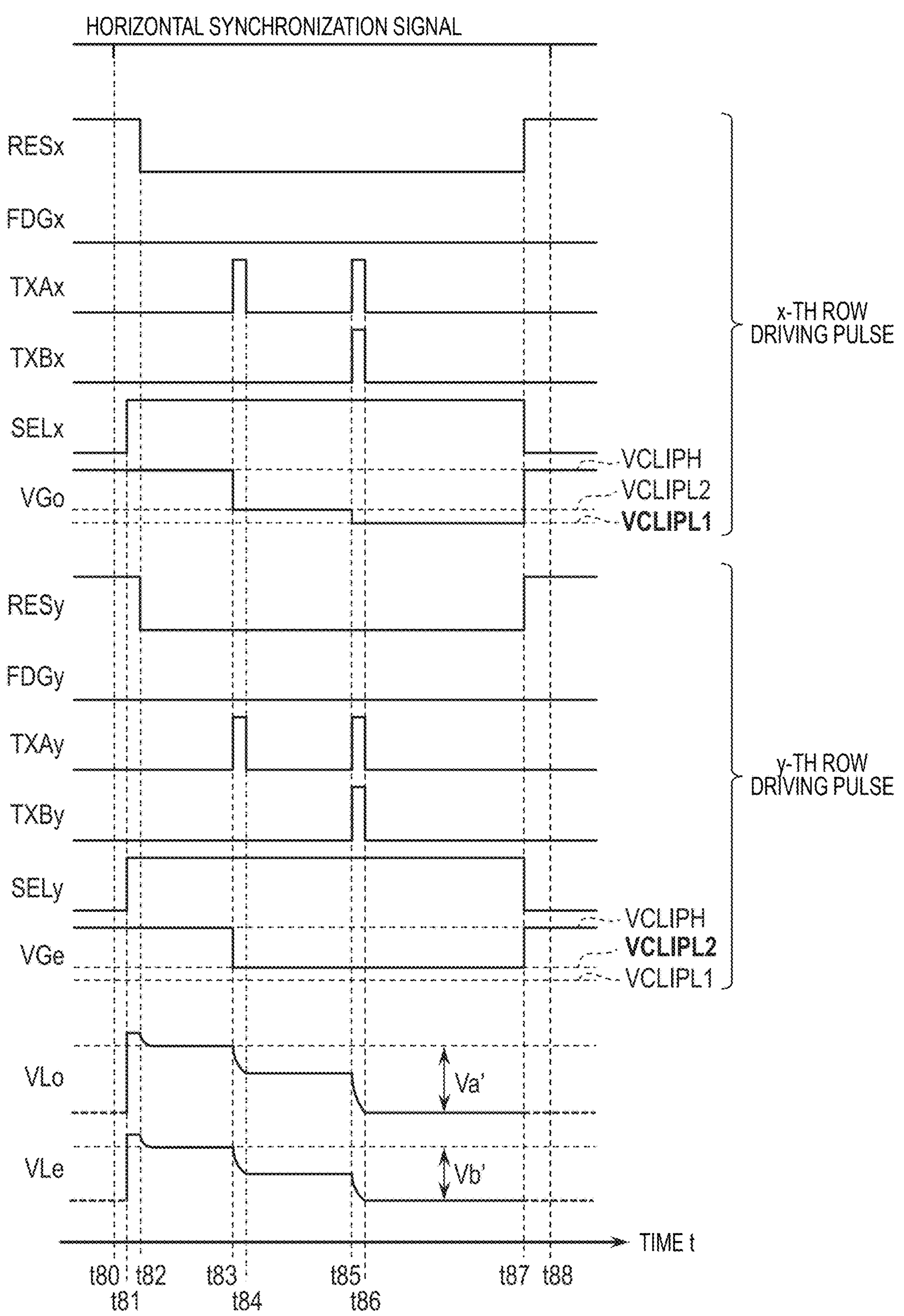
FIG. 17 is a timing chart illustrating a method of driving a photoelectric conversion device according to a sixth embodiment.

A photoelectric conversion device and a method of driving the same according to a sixth embodiment of the present invention will be described with reference to FIG. 17. The same components as those of the photoelectric conversion devices according to the first to fifth embodiments are denoted by the same reference numerals, and description thereof will be omitted or simplified. FIG. 17 is a timing chart illustrating a method of driving the photoelectric conversion device according to the present embodiment.

In the present embodiment, an example in which the driving method of the fourth embodiment in which the signal amplitude of the output line group 16*n* is limited using the amplitude limiting circuit 32 of the signal processing unit 30 is applied to the photoelectric conversion device according to the third embodiment will be described. The photoelectric conversion device according to the present embodiment is the same as the photoelectric conversion device according to the third embodiment except that the signal processing unit 30 further includes the amplitude limiting circuit 32 described in the fourth embodiment.

A method of driving the photoelectric conversion device according to the present embodiment will be described with reference to FIG. 17. FIG. 17 is a timing chart in an operation mode in which the FD capacitance switching transistor M5 is operated in the off-state.

FIG. 17 illustrates the transition of the waveform of each signal in one horizontal period corresponding to time t1 in FIG. 4 and FIG. 5. The control signals RESx, FDGx, TXAx, TXBx, and SELx are control signals supplied to the pixels 12 in the x-th row that output display signals. The voltage VGo is the gate voltage of the amplitude limiting transistor M6 of the amplitude limiting circuit 32 connected to the output line 16*n*A from which the display signal is output from the pixel 12(*x, n*) in the odd-numbered row. The control signals RESy, FDGy, TXAy, TXBy, and SELy are control signals supplied to the pixels 12 in the y-th row that output sensing signals. The voltage VGe is the gate voltage of the amplitude limiting transistor M6 of the amplitude limiting circuit 32 connected to the output line 16*n*B from which the sensing signal is output from the pixel 12(*y, n*) in the even-numbered row. The voltage VLo is a voltage of the output line 16*n*A from which the display signal is output from the pixel 12(*x, n*) in the odd-numbered row. The voltage VLe is a voltage of the output line 16*n*B from which the sensing signal is output from the pixel 12(*y, n*) in the even-numbered row. Note that the control signals RESx, FDGx, TXAx, TXBx, SELx, RESy, FDGy, TXAy, TXBy and SELy are active at high-level and inactive at low-level.

A period from time t80 to time t88 corresponds to a readout period of the pixel 12(*x, n*) and the pixel 12(*y, n*), and signal readout from the photoelectric conversion elements PDA and PDB of the pixel 12(*x, n*) and the pixel 12(*y, n*) is performed. During this period, the control signals FDGx and FDGy are maintained at low-level.

Since the timing diagram of FIG. 17 differs from the timing diagram of FIG. 15 only in the control signals RESx, RESy, FDGx, and FDGy, detailed description thereof will be omitted. In addition, since the timing diagram in the operation mode in which the FD capacitance switching transistor M5 is operated in the off-state is the same as the timing diagram of FIG. 16, the description thereof will be omitted here.

In the present embodiment, even when the FD capacitance switching transistor M5 of the pixel 12 to which the FD capacitance switching transistor M5 is added is operated in either the on-state or the off-state, it is possible to suppress the influence of crosstalk via the parasitic capacitance from the output line 16*n*B to the output line 16*n*A. This makes it possible to obtain a high-quality display image.

As described above, according to the present embodiment, it is possible to acquire a display signal having excellent image quality while acquiring a sensing signal at high speed.

Seventh Embodiment

Figure 18:
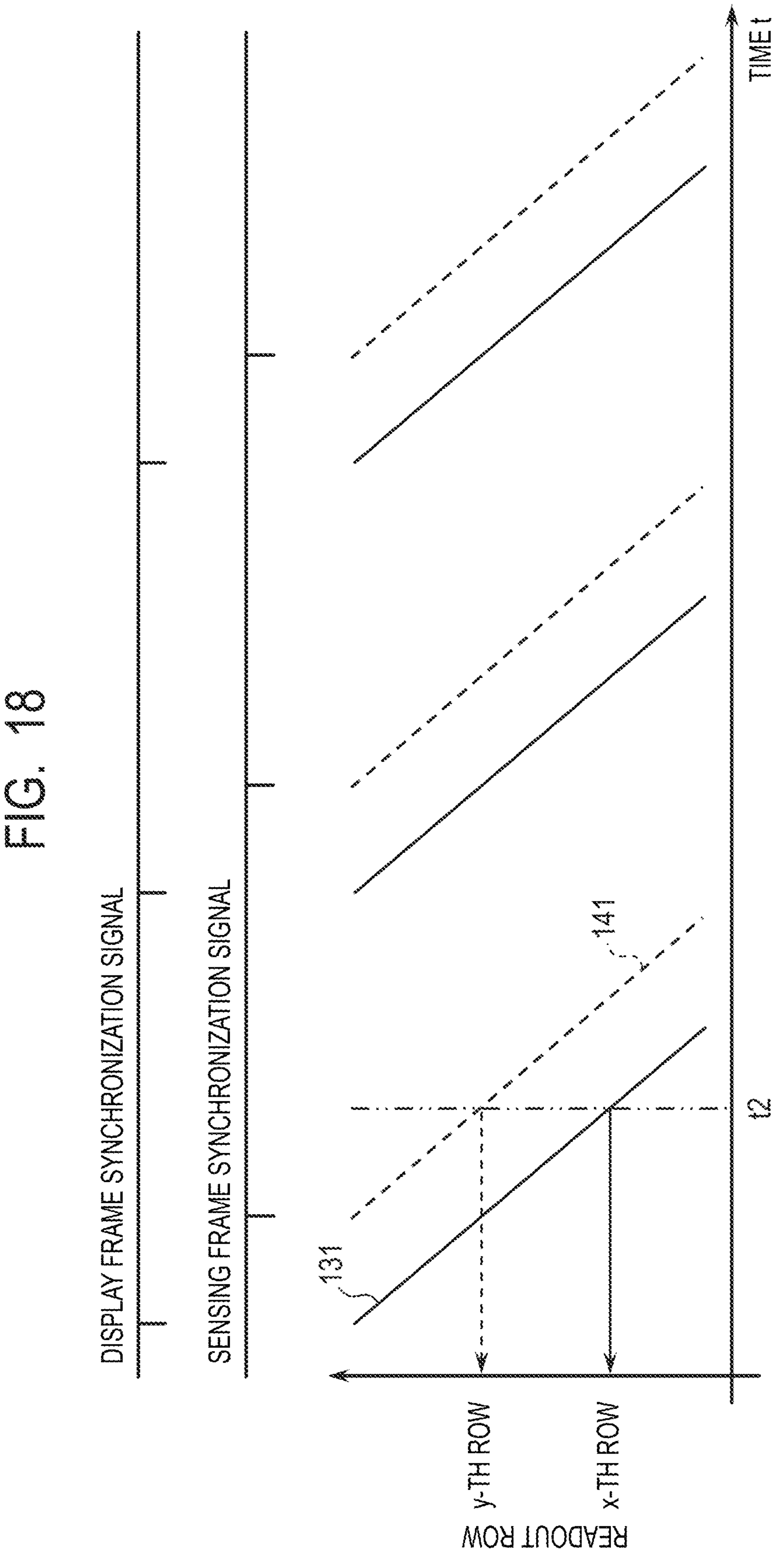
FIG. 18 is a diagram illustrating a scanning method in a row direction in a method of driving a photoelectric conversion device according to a seventh embodiment.

A method of driving a photoelectric conversion device according to a seventh embodiment of the present invention will be described with reference to FIG. 18. The same components as those of the photoelectric conversion devices according to the first to sixth embodiments are denoted by the same reference numerals, and description thereof will be omitted or simplified. FIG. 18 is a diagram illustrating a scanning method in the row direction in the photoelectric conversion device according to the present embodiment.

In the present embodiment, another driving method of the photoelectric conversion device according to the first to sixth embodiments will be described. In the driving method of the present embodiment, the scanning method in the row direction is different from the scanning method in the row direction described with reference to FIG. 4 in the first embodiment.

A scanning method in the row direction according to the present embodiment will be described with reference to FIG. 18. In FIG. 18, the horizontal axis represents time, and the vertical axis represents a pixel row from which a signal is read out. A straight line indicated by a solid line indicates a scan of display signals used for image formation in the row direction, and a straight line indicated by a broken line indicates a scan of a sensing signals in the row direction.

In the driving example of FIG. 18, similarly to the driving example of FIG. 4, it is assumed that the output line 16A connected to the pixels 12 in the odd-numbered rows is used as the output line of the display signal, and the output line 16B connected to the pixels 12 in the even-numbered rows is used as the output line of the sensing signal. The scan 131 of the display signals is started in synchronization with the display frame synchronization signal, and the scan of the sensing signals 141 is started in synchronization with the sensing frame synchronization signal. This driving example is characterized in that the frame rates of the display frame synchronization signal and the sensing frame synchronization signal are the same, but the synchronization timings of the two synchronization signals are different from each other.

Also in the driving example of FIG. 18, when the output line used for reading out the display signal and the output line used for reading out the sensing signal are adjacent to each other, crosstalk via parasitic capacitance between the two output lines becomes a problem. For example, when the sensing signal (the y'-th row in FIG. 18) and the display signal (the x'-th row in FIG. 18) read out at time t2 are a high luminance signal and a low luminance signal, respectively, the output line 16A from which the display signal is read out is affected by the output line 16B from which the sensing signal is read out.

The influence of the crosstalk between the adjacent output lines may be suppressed by applying the configuration and operation of the photoelectric conversion device described in the first to sixth embodiments. Specifically, crosstalk may be suppressed by causing the reset transistor M2 and the FD capacitance switching transistor M5 included in the pixel 12 to function as a circuit that limits the signal amplitude of the node FD. Alternatively, crosstalk may be suppressed by causing the amplitude limiting circuit 32 included in the signal processing unit 30 to function as a circuit that limits the signal amplitude of the output lines 16A and 16B. This makes it possible to suppress the influence of crosstalk and obtain a high-quality display image.

As described above, according to the present embodiment, it is possible to acquire a display signal having excellent image quality while acquiring a sensing signal at high speed.

Eighth Embodiment

Figure 19:
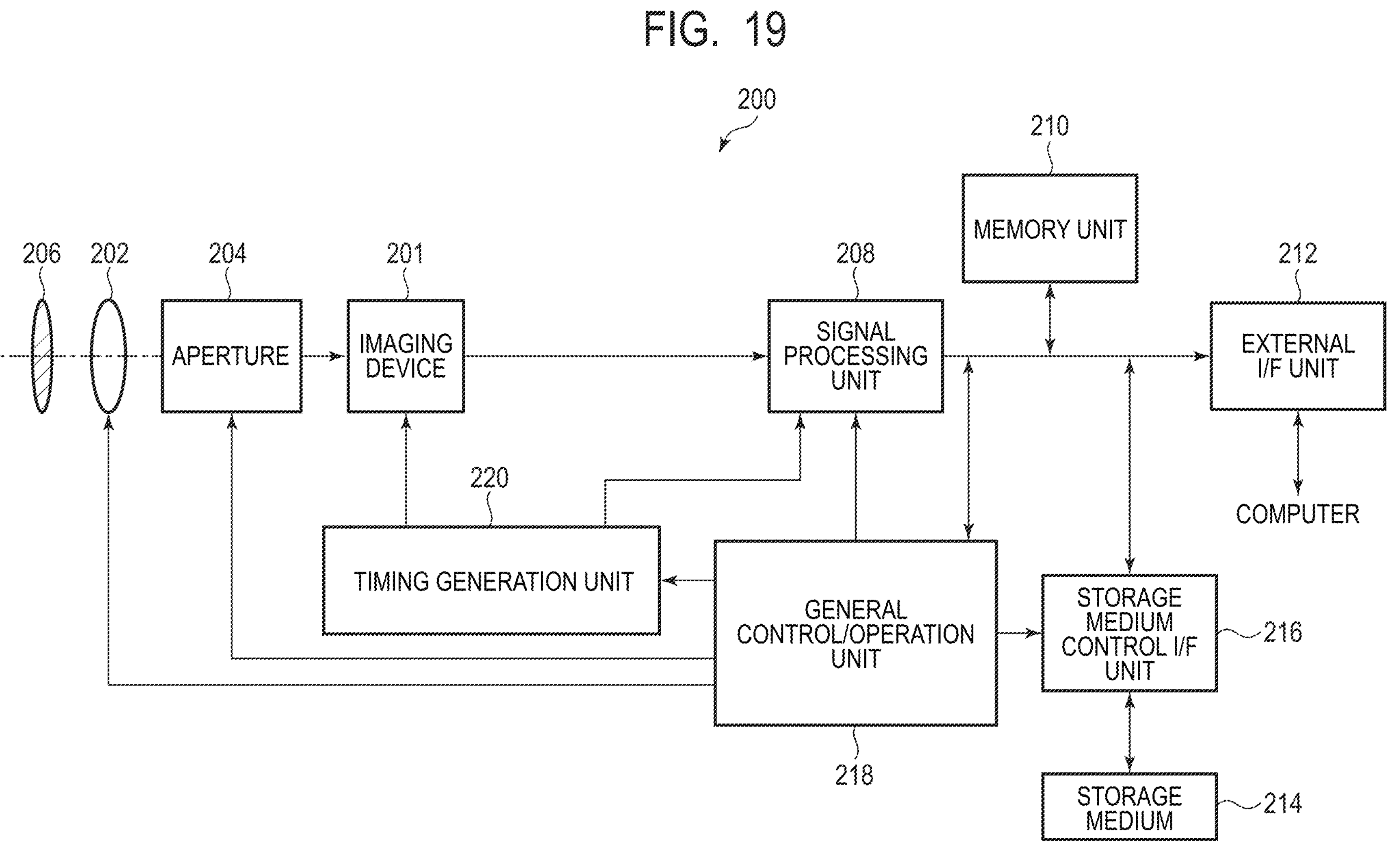
FIG. 19 is a block diagram illustrating a schematic configuration of a photoelectric conversion system according to an eighth embodiment.

A photoelectric conversion system according to an eighth embodiment of the present invention will be described with reference to FIG. 19. FIG. 19 is a block diagram illustrating a schematic configuration of the photoelectric conversion system according to the present embodiment.

The photoelectric conversion device 100 described in the first to seventh embodiments may be applied to various photoelectric conversion systems. Examples of applicable photoelectric conversion systems include digital still cameras, digital camcorders, surveillance cameras, copying machines, facsimiles, mobile phones, on-vehicle cameras, observation satellites, and the like. A camera module including an optical system such as a lens and an imaging device is also included in the photoelectric conversion system. FIG. 19 exemplifies a block diagram of a digital still camera as one of these.

The photoelectric conversion system 200 illustrated in FIG. 19 includes an imaging device 201, a lens 202 that forms an optical image of an object on the imaging device 201, an aperture 204 that changes the amount of light passing through the lens 202, and a barrier 206 that protects the lens 202. The lens 202 and the aperture 204 form an optical system that focuses light onto the imaging device 201. The imaging device 201 is the photoelectric conversion device 100 described in any of the first to seventh embodiments, and converts the optical image formed by the lens 202 into image data.

The photoelectric conversion system 200 further includes a signal processing unit 208 that processes an output signal output from the imaging device 201. The signal processing unit 208 generates image data from the digital signal output from the imaging device 201. Further, the signal processing unit 208 performs various corrections and compressions as necessary and outputs the processed image data. The imaging device 201 may include an AD conversion unit that generates a digital signal to be processed by the signal processing unit 208. The AD conversion unit may be formed on a semiconductor layer (semiconductor substrate) on which the photoelectric conversion unit of the imaging device 201 is formed or may be formed on a semiconductor layer different from the semiconductor layer on which the photoelectric conversion unit of the imaging device 201 is formed. The signal processing unit 208 may be formed on the same semiconductor layer as the imaging device 201.

The photoelectric conversion system 200 further includes a memory unit 210 for temporarily storing image data and an external interface unit (external I/F unit) 212 for communicating with an external computer or the like. The photoelectric conversion system 200 further includes a storage medium 214 such as a semiconductor memory for performing storing or reading out of imaging data, and a storage medium control interface unit (storage medium control I/F unit) 216 for performing storing on or reading out from the storage medium 214. The storage medium 214 may be built in the photoelectric conversion system 200 or may be detachable.

The photoelectric conversion system 200 further includes a general control/operation unit 218 that performs various calculations and controls the entire digital still camera, and a timing generation unit 220 that outputs various timing signals to the imaging device 201 and the signal processing unit 208. Here, the timing signal or the like may be input from the outside, and the photoelectric conversion system 200 may include at least the imaging device 201 and the signal processing unit 208 that processes the output signal output from the imaging device 201.

The imaging device 201 outputs an imaging signal to the signal processing unit 208. The signal processing unit 208 performs predetermined signal processing on the imaging signal output from the imaging device 201, and outputs the processed image data. The signal processing unit 208 generates an image using the imaging signal.

As described above, according to the present embodiment, it is possible to realize a photoelectric conversion system to which the photoelectric conversion device 100 according to any of the first to seventh embodiments is applied.

Ninth Embodiment

Figures 20A, 20B:
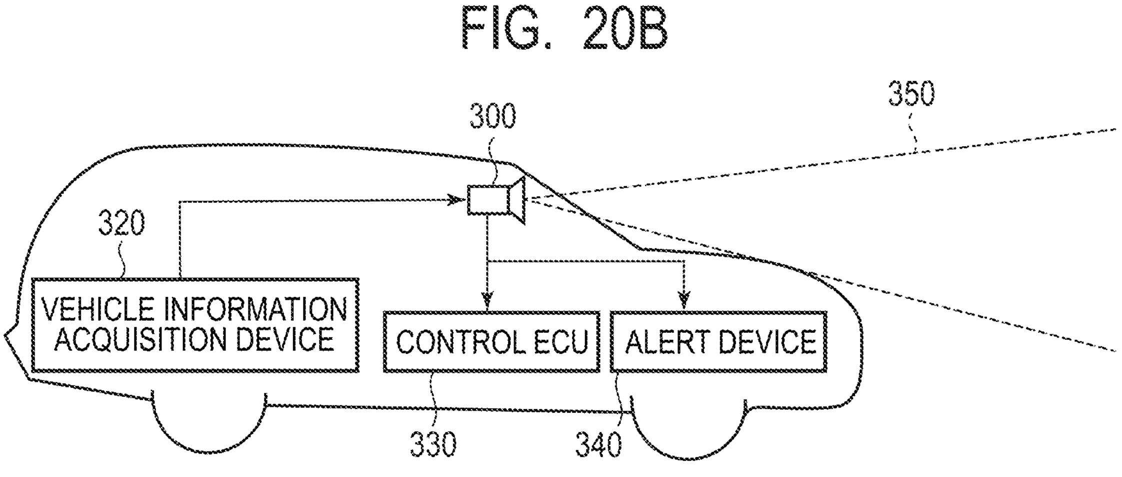
FIG. 20A is a diagram illustrating a configuration example of a photoelectric conversion system according to a ninth embodiment.
FIG. 20B is a diagram illustrating a configuration example of movable object according to the ninth embodiment.

A photoelectric conversion system and mobile object according to a ninth embodiment of the present invention will be described with reference to FIG. 20A and FIG. 20B. FIG. 20A is a diagram illustrating the configuration of a photoelectric conversion system according to the present embodiment. FIG. 20B is a diagram illustrating the configuration of a mobile object according to the present embodiment.

FIG. 20A illustrates an example of a photoelectric conversion system related to an on-vehicle camera. The photoelectric conversion system 300 includes an imaging device 310. The imaging device 310 is the photoelectric conversion device 100 according to any one of the first to seventh embodiments. The photoelectric conversion system 300 includes an image processing unit 312 that performs image processing on a plurality of image data acquired by the imaging device 310, and a parallax acquisition unit 314 that calculates parallax (phase difference of parallax images) from the plurality of image data acquired by the imaging device 310. The photoelectric conversion system 300 further includes a distance acquisition unit 316 that calculates a distance to an object based on the calculated parallax, and a collision determination unit 318 that determines whether there is a collision possibility based on the calculated distance. Here, the parallax acquisition unit 314 and the distance acquisition unit 316 are examples of a distance information acquisition unit that acquires distance information to the object. That is, the distance information is information related to a parallax, a defocus amount, a distance to the object, and the like. The collision determination unit 318 may determine the collision possibility using any of the distance information. The distance information acquisition unit may be realized by dedicatedly designed hardware or may be realized by a software module. Further, it may be realized by a field programmable gate array (FPGA), an application specific integrated circuit (ASIC), or the like, or may be realized by a combination of these.

The photoelectric conversion system 300 is connected to the vehicle information acquisition device 320 and may acquire vehicle information such as a vehicle speed, a yaw rate, and a steering angle. Further, the photoelectric conversion system 300 is connected to a control ECU 330 which is a control device that outputs a control signal for generating a braking force to the vehicle based on the determination result of the collision determination unit 318. The photoelectric conversion system 300 is also connected to an alert device 340 that issues an alert to the driver based on the determination result of the collision determination unit 318. For example, when the determination result of the collision determination unit 318 indicates that the possibility of collision is high, the control ECU 330 performs vehicle control to avoid collision and reduce damage by, for example, applying a brake, returning an accelerator, or suppressing engine output. The alert device 340 gives an alert to the user by sounding an alarm such as a sound, displaying alert information on a screen of a car navigation system or the like, giving vibration to a seat belt or a steering wheel, or the like.

In the present embodiment, an image of the surroundings of the vehicle, for example, the front or the rear is captured by the photoelectric conversion system 300. FIG. 20B illustrates the photoelectric conversion system in the case of capturing an image in front of the vehicle (imaging range 350). The vehicle information acquisition device 320 sends an instruction to the photoelectric conversion system 300 or the imaging device 310. With such a configuration, the accuracy of distance measurement may be further improved.

Although an example in which control is performed so as not to collide with another vehicle has been described above, the present invention is also applicable to control in which automatic driving is performed so as to follow another vehicle, control in which automatic driving is performed so as not to protrude from a lane, and the like. Further, the photoelectric conversion system is not limited to a vehicle such as an own vehicle and may be applied to other mobile objects (mobile devices), such as, for example, a ship, an aircraft, or an industrial robot. In addition, the present invention is not limited to the mobile object and may be widely applied to equipment using object recognition, such as intelligent transport systems (ITS).

Tenth Embodiment

Figure 21:
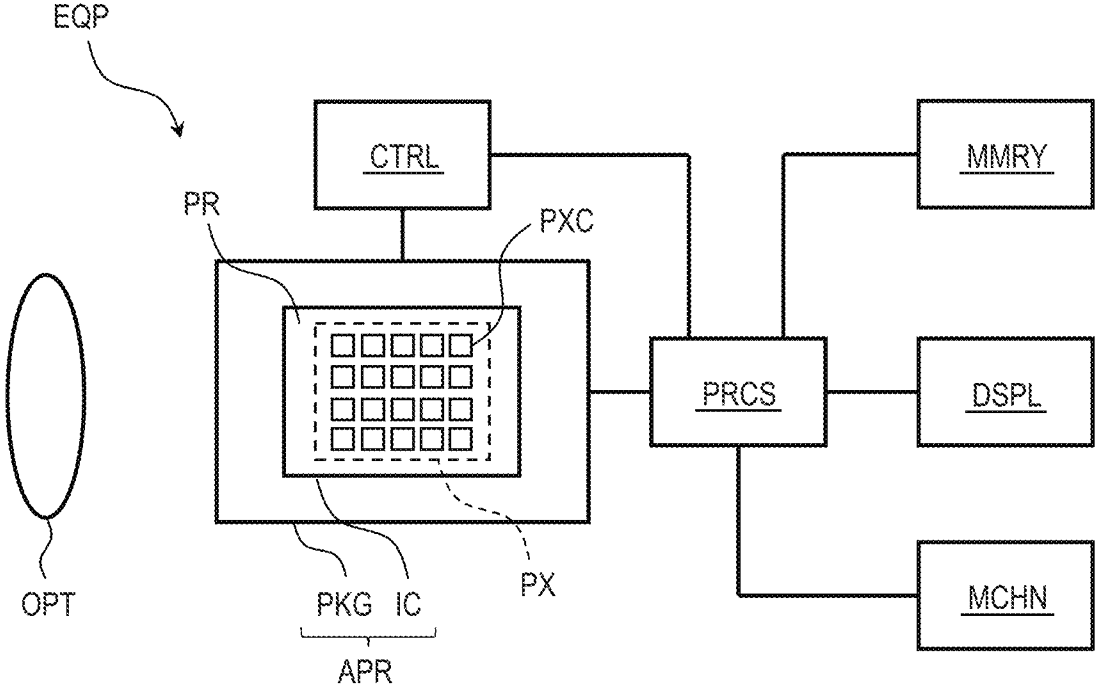
FIG. 21 is a block diagram illustrating a schematic configuration of an equipment according to a tenth embodiment.

An equipment according to a tenth embodiment of the present invention will be described with reference to FIG. 21. FIG. 21 is a block diagram illustrating a schematic configuration of an equipment according to the present embodiment.

FIG. 21 is a schematic diagram illustrating an equipment EQP including a photoelectric conversion device APR. The photoelectric conversion device APR has the function of the photoelectric conversion device 100 according to any of the first to seventh embodiments. All or part of the photoelectric conversion device APR is a semiconductor device IC. The photoelectric conversion device APR of the present example may be used as, for example, an image sensor, an AF (Auto Focus) sensor, a photometric sensor, or a distance measurement sensor. The semiconductor device IC includes a pixel region PX in which pixel circuits PXC each including a photoelectric conversion unit are arranged in a matrix. The semiconductor device IC may include a peripheral region PR around the pixel region PX. A circuit other than the pixel circuit may be disposed in the peripheral region PR.

The photoelectric conversion device APR may have a structure (chip stacked structure) in which a first semiconductor chip provided with a plurality of photoelectric conversion units and a second semiconductor chip provided with peripheral circuits are stacked. Each of the peripheral circuits in the second semiconductor chip may be column circuits corresponding to pixel columns of the first semiconductor chip. The peripheral circuits in the second semiconductor chip may be matrix circuits corresponding to pixels or pixel blocks in the first semiconductor chip. As the connection between the first semiconductor chip and the second semiconductor chip, a through electrode (Through Silicon Via (TSV)), an inter-chip interconnection by direct bonding of a conductor such as copper, a connection by a micro bump between chips, a connection by wire bonding, or the like may be employed.

The photoelectric conversion device APR may include a package PKG that accommodates the semiconductor device IC in addition to the semiconductor device IC. The package PKG may include a base body to which the semiconductor device IC is fixed, a lid body such as glass facing the semiconductor device IC, and connection members such as bonding wires or bumps for connecting terminals provided on the base body and terminals provided on the semiconductor device IC.

The equipment EQP may further include at least one of an optical device OPT, a control device CTRL, a processing device PRCS, a display device DSPL, a storage device MMRY, and a mechanical device MCHN. The optical device OPT corresponds to the photoelectric conversion device APR as a photoelectric conversion device, and is, for example, a lens, a shutter, or a mirror. The control device CTRL controls the photoelectric conversion device APR, and is, for example, a semiconductor device such as an application specific integrated circuit (ASIC). The processing device PRCS processes a signal output from the photoelectric conversion device APR and constitutes an analog front end (AFE) or a digital front end (DFE). The processing unit PRCS is a semiconductor device such as a central processing unit (CPU) or an ASIC. The display device DSPL may be an electroluminescent (EL) display device or a liquid crystal display device that displays information (image) obtained by the photoelectric conversion device APR. The storage device MMRY may be a magnetic device or a semiconductor device that stores information (image) obtained by the photoelectric conversion device APR. The storage device MMRY may be a volatile memory such as an SRAM or a DRAM, or a nonvolatile memory such as a flash memory or a hard disk drive. The mechanical device MCHN may include a movable portion or a propulsion portion such as a motor or an engine. In the equipment EQP, a signal output from the photoelectric conversion device APR is displayed on the display device DSPL or transmitted to the outside by a communication device (not illustrated) included in the equipment EQP. Therefore, it is preferable that the equipment EQP further includes a storage device MMRY and a processing device PRCS separately from the storage circuit unit and the arithmetic circuit unit included in the photoelectric conversion device APR.

The equipment EQP illustrated in FIG. 21 may be an electronic device such as an information terminal (for example, a smartphone or a wearable terminal) having a photographing function or a camera (for example, an interchangeable lens camera, a compact camera, a video camera, and a monitoring camera). The mechanical device MCHN in the camera may drive components of the optical device OPT for zooming, focusing, and shutter operation. The equipment EQP may be a transportation device (movable object), such as a vehicle, a ship, or an airplane. The equipment EQP may be a medical device such as an endoscope or a CT scanner.

The mechanical device MCHN in the transport device may be used as a mobile device. The equipment EQP as a transport device is suitable for transporting the photoelectric conversion device APR, or for assisting and/or automating operation (manipulation) by an imaging function. The processing device PRCS for assisting and/or automating driving (manipulation) may perform processing for operating the mechanical device MCHN as a mobile device based on information obtained by the photoelectric conversion device APR.

The photoelectric conversion device APR according to the present embodiment may provide a high value to a designer, a manufacturer, a seller, a purchaser, and/or a user thereof. Therefore, when the photoelectric conversion device APR is mounted on the equipment EQP, the value of the equipment EQP may also be increased. Therefore, in manufacturing and selling the equipment EQP, it is advantageous to determine the mounting of the photoelectric conversion device APR of the present embodiment on the equipment EQP in order to increase the value of the equipment EQP.

Modified Embodiments

The present invention is not limited to the above-described embodiments, and various modifications are possible.

For example, an example in which a part of the configuration of any of the embodiments is added to another embodiment or an example in which a part of the configurations of any of the embodiments is substituted with some of the configurations of another embodiment is also an embodiment of the present invention.

Further, in the first to seventh embodiments, the case where the number of output lines constituting the output line group 16 of each column is two is assumed, but the number of output lines constituting the output line group 16 of each column may be three or more.

The configurations of the pixels 12 described in the first to seventh embodiments are merely examples and may be appropriately changed. For example, the number of photoelectric conversion elements PD included in one pixel 12 is not limited to two and may be three or more. Further, one FD capacitance switching transistor is not necessarily required, and two or more FD capacitance switching transistors may be connected to the node FD in parallel or in series. The pixel 12 may further include a charge draining transistor connected to the photoelectric conversion element PD.

The photoelectric conversion systems described in the eighth and ninth embodiments are examples of photoelectric conversion systems to which the photoelectric conversion device of the present invention can be applied, and the photoelectric conversion system to which the photoelectric conversion device of the present invention may be applied is not limited to the configuration illustrated in FIG. 19 and FIG. 20A.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2024-029426, filed Feb. 29, 2024, which is hereby incorporated by reference herein in its entirety.

What is claimed is:

1. A photoelectric conversion device comprising:

a plurality of pixels arranged to form a plurality of rows and a plurality of columns and each including a photoelectric conversion unit;

a plurality of output line groups arranged corresponding to the plurality of columns and each including at least a first output line and a second output line;

a pixel control unit configured to control a readout of signals from the plurality of pixels to the plurality of output line groups in units of the rows; and an amplitude limiting unit configured to limit ranges of signal amplitudes of the signals output to the plurality of output line groups, wherein the pixel control unit is configured to execute a first scan in which signals of pixels connected to the first output line of each column are sequentially read out in units of the row, and a second scan in which signals of pixels connected to the second output line of each column are sequentially read out in units of the row, wherein a period in which a signal of a first pixel is read out to the first output line by the first scan and a period in which a signal of a second pixel connected to the second output line adjacent to the first output line to which the first pixel is connected is read out to the second output line by the second scan overlap each other, and wherein the amplitude limiting unit is configured to limit ranges of signal amplitudes in the first output line and the second output line so that a maximum signal amplitude in the first output line and a maximum signal amplitude in the second output line are different.

2. The photoelectric conversion device according to claim 1, wherein each of the plurality of pixels includes a floating diffusion to which charge of the photoelectric conversion unit is transferred, an amplifier transistor configured to output a signal corresponding to a potential of the floating diffusion to a corresponding output line, and a reset transistor configured to reset the potential of the floating diffusion, and wherein the pixel control unit is configured to cause the reset transistor to function as the amplitude limiting unit by setting a gate potential when controlling the reset transistor of the first pixel to a non-reset state and a gate potential when controlling the reset transistor of the second pixel to a non-reset state to different potentials.

3. The photoelectric conversion device according to claim 2, wherein a difference between the gate potential when the reset transistor of the first pixel is controlled to the non-reset state and a gate potential when the reset transistor of the first pixel is controlled to a reset state is larger than a difference between the gate potential when the reset transistor of the second pixel is controlled to the non-reset state and a gate potential when the reset transistor of the second pixel is controlled to a reset state, and wherein the maximum signal amplitude in the first output line is larger than the maximum signal amplitude in the second output line.

4. The photoelectric conversion device according to claim 2, wherein each of the plurality of pixels further includes a capacitance switching transistor connected to the floating diffusion, and wherein the pixel control unit is configured to cause the reset transistor to function as the amplitude limiting unit when controlling the capacitance switching transistor to be in an on-state.

5. The photoelectric conversion device according to claim 1, wherein each of the plurality of pixels includes a floating diffusion to which charge of the photoelectric conversion unit is transferred, an amplifier transistor configured to output a signal corresponding to a potential of the floating diffusion to a corresponding output line, and a capacitance switching transistor connected to the floating diffusion, and wherein the pixel control unit is configured to cause the capacitance switching transistor to function as the amplitude limiting unit by setting a gate potential when the capacitance switching transistor of the first pixel is controlled to be in an off-state and a gate potential when the capacitance switching transistor of the second pixel is controlled to be in an off-state to different potentials.

6. The photoelectric conversion device according to claim 5, wherein a difference between the gate potential when the capacitance switching transistor of the first pixel is controlled to the off-state and a gate potential when the capacitance switching transistor of the first pixel is controlled to an on-state is larger than a difference between the gate potential when the capacitance switching transistor of the second pixel is controlled to the off-state and a gate potential when the capacitance switching transistor of the second pixel is controlled to an on-state, and wherein the maximum signal amplitude in the first output line is larger than the maximum signal amplitude in the second output line.

7. The photoelectric conversion device according to claim 5, wherein each of the plurality of pixels further includes a reset transistor configured to reset a potential of the floating diffusion, and wherein the capacitance switching transistor is connected between the reset transistor and the floating diffusion.

8. The photoelectric conversion device according to claim 5, wherein the capacitance switching transistor is connected between the floating diffusion and a ground voltage node.

9. The photoelectric conversion device according to claim 1, wherein the photoelectric conversion unit of each of the plurality of pixels includes a first photoelectric conversion unit and a second photoelectric conversion unit configured to receive light passing through different pupil regions of one microlens, wherein the amplitude limiting unit is configured to limit ranges of signal amplitudes in the first output line and the second output line so that the maximum signal amplitude in the first output line and the maximum signal amplitude in the second output line become the same when reading out a signal based on charge of the first photoelectric conversion unit from each of the first pixel and the second pixel, and wherein the amplitude limiting unit is configured to limit ranges of signal amplitudes in the first output line and the second output line so that the maximum signal amplitude in the first output line and the maximum signal amplitude in the second output line are different from each other when reading out a signal based on the charges of the first photoelectric conversion unit and the second photoelectric conversion unit from each of the first pixel and the second pixel.

10. The photoelectric conversion device according to claim 1, wherein the amplitude limiting unit includes a plurality of amplitude limiting circuits each including an amplitude limiting transistor provided corresponding to each of the plurality of output lines and connected between a node to which a fixed voltage is supplied and a corresponding output line, and wherein the amplitude limiting unit is configured to set a gate potential supplied to the amplitude limiting transistor of the amplitude limiting circuit connected to the first output line and a gate potential supplied to the amplitude limiting transistor of the amplitude limiting circuit connected to the second output line to different potentials when the signals of first pixel and the second pixel are read out.

11. The photoelectric conversion device according to claim 10, wherein, when the signals of the first pixel and the second pixels are read out, a difference between the gate potential supplied to the amplitude limiting transistor of the amplitude limiting circuit connected to the first output line and a predetermined gate potential for controlling the amplitude limiting transistor of the amplitude limiting circuit connected to the first output line to be in an on-state is larger than a difference between the gate potential supplied to the amplitude limiting transistor of the amplitude limiting circuit connected to the second output line and a predetermined gate potential for controlling the amplitude limiting transistor of the amplitude limiting circuit connected to the second output line to be in an on-state, and wherein the maximum signal amplitude in the first output line is larger than the maximum signal amplitude in the second output line.

12. The photoelectric conversion device according to claim 10, wherein the photoelectric conversion unit of each of the plurality of pixels includes a first photoelectric conversion unit and a second photoelectric conversion unit configured to receive light passing through different pupil regions of one microlens, wherein a gate potential supplied to the amplitude limiting transistor of the amplitude limiting circuit connected to the first output line and a gate potential supplied to the amplitude limiting transistor of the amplitude limiting circuit connected to the second output line are set to the same potential when a signal based on the charge of the first photoelectric conversion unit is read out from each of the first pixel and the second pixel, and wherein a gate potential supplied to the amplitude limiting transistor of the amplitude limiting circuit connected to the first output line and a gate potential supplied to the amplitude limiting transistor of the amplitude limiting circuit connected to the second output line are set to different potentials when a signal based on the charges of the first photoelectric conversion unit and the second photoelectric conversion unit is read out from each of the first pixel and the second pixel.

13. The photoelectric conversion device according to claim 12, wherein, when reading out a signal based on charges of the first photoelectric conversion unit and the second photoelectric conversion unit from each of the first pixel and the second pixel, a difference between the gate potential supplied to the amplitude limiting transistor of the amplitude limiting circuit connected to the first output line and a predetermined gate potential for controlling the amplitude limiting transistor of the amplitude limiting circuit connected to the first output line to be in an on-state is larger than a difference between the gate potential supplied to the amplitude limiting transistor of the amplitude limiting circuit connected to the second output line and a predetermined gate potential for controlling the amplitude limiting transistor of the amplitude limiting circuit connected to the second output line to be in an on-state, and wherein the maximum signal amplitude in the first output line is larger than the maximum signal amplitude in the second output line.

14. The photoelectric conversion device according to claim 1, wherein a signal output to the first output line is a display signal, and a signal output to the second output line is a sensing signal.

15. The photoelectric conversion device according to claim 1, wherein the pixel control unit is configured to perform the second scan on the plurality of pixels a plurality of times while performing the first scan on the plurality of pixels one time.

16. The photoelectric conversion device according to claim 15, further comprising: a circuit configured to apply a gain to a signal output to the output line group, wherein, when the gain is a first gain, a difference between a maximum signal amplitude of the first output line in the first scan and a maximum signal amplitude of the second output line in the second scan is a first difference, and wherein, when the gain is a second gain greater than the first gain, a difference between a maximum signal amplitude of the first output line in the first scan and a maximum signal amplitude of the second output line in the second scan is a second difference larger than the first difference.

17. The photoelectric conversion device according to claim 1, wherein a length of a period in which the first scan is performed on the plurality of pixels is equal to a length of a period in which the second scan is performed on the plurality of pixels.

18. The photoelectric conversion device according to claim 1, wherein the first output line to which the first pixel is connected and the second output line to which the second pixel is connected are arranged in the same column.

19. The photoelectric conversion device according to claim 1, wherein the first output line to which the first pixel is connected and the second output line to which the second pixel is connected are arranged in adjacent columns.

20. A photoelectric conversion system comprising:

the photoelectric conversion device according to claim 1; and a signal processing device configured to process a signal output from the photoelectric conversion device.

21. A movable object comprising:

the photoelectric conversion device according to claim 1;

a distance information acquisition unit configured to acquire distance information to an object from a parallax image based on a signal from the photoelectric conversion device; and a control unit configured to control the movable object based on the distance information.

22. An equipment comprising:

the photoelectric conversion device according to claim 1; and at least one of an optical device corresponding to the photoelectric conversion device, a control device configured to control the photoelectric conversion device, a processing device configured to process a signal output from the photoelectric conversion device, a mechanical device that is controlled based on information obtained by the photoelectric conversion device, a display device configured to display information obtained by the photoelectric conversion device, and a storage device configured to store information obtained by the photoelectric conversion device.

23. A method of driving a photoelectric conversion device comprising a plurality of pixels arranged to form a plurality of rows and a plurality of columns and each including a photoelectric conversion unit, and a plurality of output line groups arranged corresponding to the plurality of columns and each including at least a first output line and a second output line, the method comprising:

limiting ranges of signal amplitudes in the first output line and the second output line so that a maximum signal amplitude in the first output line and a maximum signal amplitude in the second output line are different, when a first scan in which a signal of a pixel connected to the first output line of each column is sequentially read out in units of the row and a second scan in which a signal of a pixel connected to the second output line of each column is sequentially read out in units of the row are executed, and a period in which a signal of a first pixel is read out by the first scan and a period in which a signal of a second pixel connected to the second output line adjacent to the first output line to which the first pixel is connected is read out by the second scan overlap each other.

* * * * *